US008665243B2

(12) United States Patent
Senda et al.

(10) Patent No.: US 8,665,243 B2
(45) Date of Patent: Mar. 4, 2014

(54) SENSOR DEVICE, METHOD OF DRIVING SENSOR ELEMENT, DISPLAY DEVICE WITH INPUT FUNCTION AND ELECTRONIC UNIT

(75) Inventors: Michiru Senda, Aichi (JP); Makoto Takatoku, Aichi (JP)

(73) Assignee: Japan Display West Inc., Aichi-Ken (JP)

( * ) Notice: Subject to any disclaimer, the term of this patent is extended or adjusted under 35 U.S.C. 154(b) by 650 days.

(21) Appl. No.: 12/947,038

(22) Filed: Nov. 16, 2010

(65) Prior Publication Data

US 2011/0127991 A1 Jun. 2, 2011

(30) Foreign Application Priority Data

Nov. 27, 2009 (JP) ................................ P2009-270423

(51) Int. Cl.
*G06F 3/042* (2006.01)

(52) U.S. Cl.
USPC .......................... 345/175; 345/173; 178/18.09

(58) Field of Classification Search
USPC ............ 345/156, 173–178; 178/18.03, 18.09,
178/18.11; 382/103, 168, 170, 171, 172,
382/188, 189, 203, 224, 225
See application file for complete search history.

(56) References Cited

U.S. PATENT DOCUMENTS

| 8,085,251 | B2 * | 12/2011 | Harada et al. ................. 345/173 |
| 2006/0170658 | A1 * | 8/2006 | Nakamura et al. ............ 345/173 |
| 2006/0214892 | A1 | 9/2006 | Harada et al. |
| 2007/0109239 | A1 * | 5/2007 | den Boer et al. ................ 345/87 |
| 2009/0050891 | A1 * | 2/2009 | Katoh ............................. 257/66 |
| 2009/0123029 | A1 * | 5/2009 | Harada et al. ................. 382/103 |
| 2009/0147191 | A1 | 6/2009 | Nakajima et al. |
| 2009/0273580 | A1 * | 11/2009 | Ota et al. ....................... 345/175 |
| 2010/0053348 | A1 * | 3/2010 | Yoshimoto et al. ......... 348/218.1 |
| 2010/0073327 | A1 * | 3/2010 | Mau et al. ..................... 345/175 |
| 2010/0117990 | A1 * | 5/2010 | Yahata .......................... 345/175 |
| 2010/0128004 | A1 | 5/2010 | Harada et al. |
| 2010/0134444 | A1 * | 6/2010 | Yahata .......................... 345/175 |
| 2010/0225617 | A1 * | 9/2010 | Yoshimoto et al. ........... 345/175 |
| 2010/0225618 | A1 * | 9/2010 | Yamashita et al. ............ 345/175 |
| 2011/0050644 | A1 * | 3/2011 | Su et al. ........................ 345/175 |

FOREIGN PATENT DOCUMENTS

| JP | 2006-276223 | 12/2006 |
| JP | 2008-233257 | 10/2008 |
| WO | 2009/119417 | 10/2009 |

OTHER PUBLICATIONS

Japanese Patent Office, Office Action issued in connection with Japanese Patent Application No. 2009-270423, dated May 14, 2013. (2 pages).

* cited by examiner

*Primary Examiner* — Dmitriy Bolotin
(74) *Attorney, Agent, or Firm* — K&L Gates LLP

(57) ABSTRACT

A sensor device includes sensor elements arranged in a matrix form, and a sensor driving section driving the sensor elements. Each of the sensor elements includes a photoelectric conversion element generating electric charge, a storage node storing electric charge, to show a voltage which fluctuates according to the stored electric charge, a reset transistor resetting the voltage in the storage node and a readout section reading the voltage value resulted from the stored electric charge in the storage node, to output the resultant voltage value. The sensor driving section controls the reset transistor so that the storage nodes of the sensor elements over sensor element lines are reset into the predetermined reset voltage at a time, and then performs read control after a lapse of a predetermined exposure period to allow the sensor detection signals to be sequentially outputted from the respective sensor elements arranged in each sensor element lines.

15 Claims, 34 Drawing Sheets

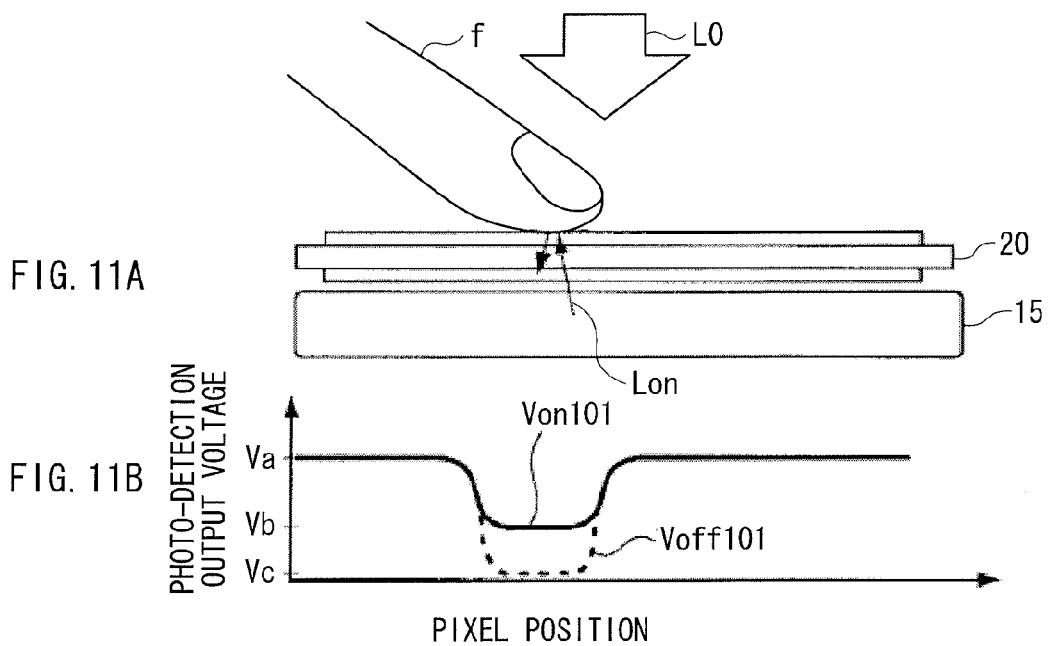
FIG. 11A
FIG. 11B
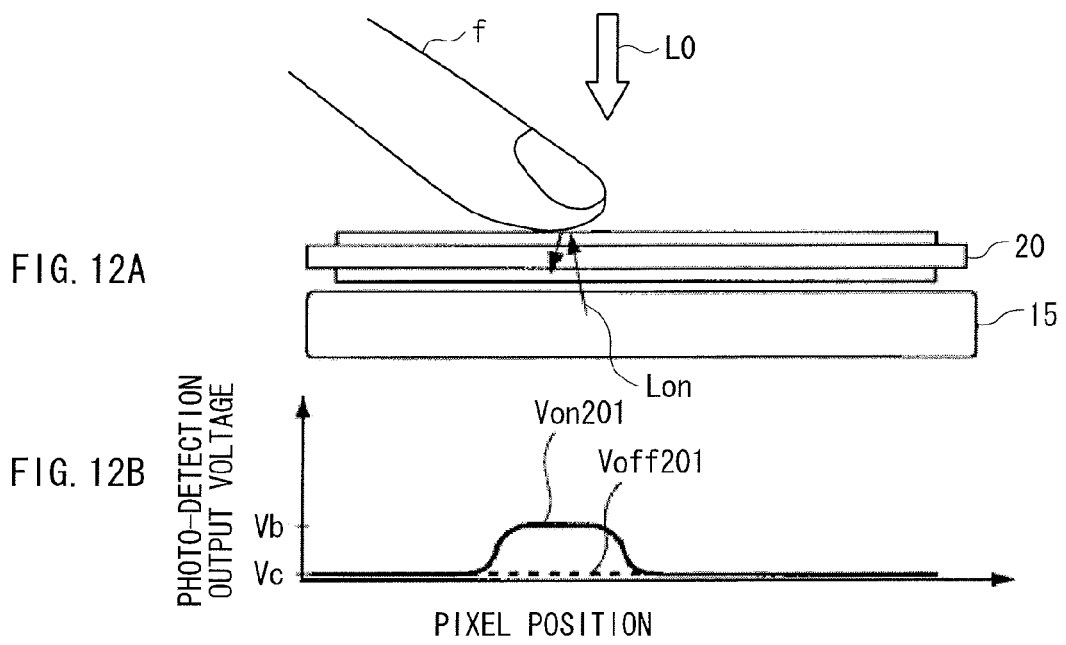
FIG. 12A
FIG. 12B

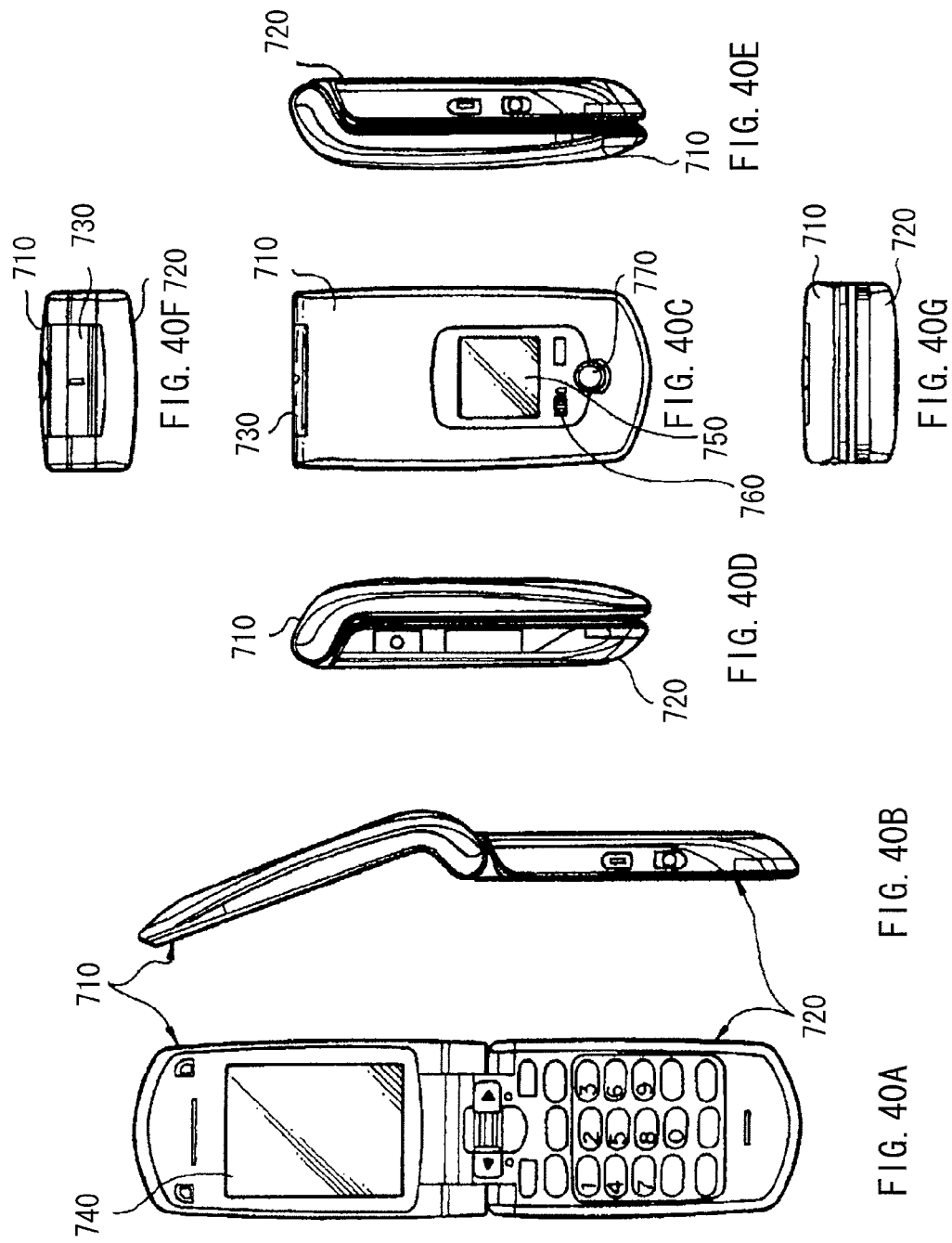

SENSOR DEVICE, METHOD OF DRIVING SENSOR ELEMENT, DISPLAY DEVICE WITH INPUT FUNCTION AND ELECTRONIC UNIT

CROSS REFERENCES TO RELATED APPLICATIONS

The present application contains subject matter related to that disclosed in Japanese Priority Patent Application JP 2009-270423 filed in the Japan Patent Office on Nov. 27, 2009, the entire content of which is hereby incorporated by reference.

BACKGROUND

The present application relates to a sensor device detecting the position or the like of a proximity object by using a sensor element, a method of diving a sensor element applied to such a sensor device, a display device having a sensor function (input function) and a display function, and an electronic unit including such a display device.

Previously, there have been known techniques of detecting the position of an object touching or close to a display surface of a display device. For example, there is known a technique providing such a structure that a film-like transparent touch panel is disposed to be laid on a display panel. As a system of such a touch panel, a pressure sensitive type and a capacitance type have been previously known.

Further, there has been developed a display device in which display pixels and photo-detectors are arranged in a matrix form within a display panel so that the display panel itself has an optical sensor function (see Japanese Unexamined Patent Application Publications No. 2006-276223 and No. 2008-233257).

SUMMARY

In the display device having the optical sensor function as mentioned above, a photoelectric conversion element such as a PIN photodiode is used as the photo-detector. Electric charge generated according to an amount of received light and supplied from the photoelectric conversion element is stored in a storage node, and a voltage value according to the stored electric charge of the storage node is read out and output as a sensor detection signal. An amount of light entering the photoelectric conversion element changes according to the position, distance, size and the like of an object close to a panel surface and thus the sensor detection signal changes as well. Therefore, it may be possible to detect the position and the like of the object close to the surface of the panel, by appropriately processing the sensor detection signal from each of the photo-detectors arranged in the matrix form. In such a device, read operation is carried out after a predetermined light-receiving (exposure) period by the photoelectric conversion element and then, after the voltage value of the storage node is reset to a reset voltage, operation of light receiving and reading is repeated.

Incidentally, it is known that in the photoelectric conversion element, a dark current (thermally stimulated current) flows even in a state of no incident light. This dark current changes with temperature and has such a characteristic that the higher the temperature is, the larger the amount of flowing current is. For this reason, there is a case in which even when the amount of incident light is constant, the voltage of the storage node changes if the temperature is different, which adversely affects a detection result. In particular, there is a possibility that when the temperature becomes higher, an influence of the dark current increases, which raises the voltage of the storage node, thereby leading to a saturated state of the storage node. Therefore, it is desired that some measures be taken to reduce this influence of the dark current which accompanies a change in temperature, but the measures in the past are insufficient.

In view of the foregoing, it is desirable to provide a sensor device, a method of driving a sensor element, a display device with an input function, and an electronic unit, which are capable of performing stable detection operation by reducing the influence of the dark current accompanying a change in temperature.

According to an embodiment, there is provided a sensor device having a plurality of sensor elements arranged in a matrix form, and a sensor driving section driving the plurality of sensor elements. Each of the plurality of sensor elements includes a photoelectric conversion element generating electric charge according to an amount of received light, a storage node storing electric charge generated by the photoelectric conversion element, to show a voltage which fluctuates according to the stored electric charge, a reset transistor having an end connected to an end of the photoelectric conversion element and resetting the voltage in the storage node to a predetermined reset voltage, and a readout section reading the voltage value resulted from the stored electric charge in the storage node, to output the resultant voltage value as a sensor detection signal. The sensor driving section controls the reset transistor so that the storage nodes of the sensor elements over a plurality of sensor element lines are reset into the predetermined reset voltage at a time, and then performs read control after a lapse of a predetermined exposure period so as to allow the sensor detection signals to be sequentially outputted from the respective sensor elements arranged in each of the sensor element lines. Here, the sensor driving section may perform, after the lapse of the exposure period, control of holding the voltage in the storage nodes in the sensor elements over the plurality of sensor element lines at a time so as to be prevented from fluctuation due to the electric charge generated in the photoelectric conversion element, and the sensor driving section may perform, while the voltage in the storage nodes are maintained in such a hold state, read control so as to allow the sensor detection signals to be sequentially outputted from the respective sensor elements arranged in each of the sensor element lines.

According to another embodiment, there is provided a method of driving a sensor element, the method including steps of: providing a plurality of sensor elements arranged in a matrix form, each of the sensor elements including a photoelectric conversion element generating electric charge according to an amount of received light, a storage node storing electric charge generated by the photoelectric conversion element, to show a voltage which fluctuates according to the stored electric charge, a reset transistor having an end connected to an end of the photoelectric conversion element and resetting the voltage in the storage node to a predetermined reset voltage, and a readout section reading the voltage value resulted from the stored electric charge in the storage node, to output the resultant voltage value as a sensor detection signal, and controlling the reset transistor so that the storage nodes of the sensor elements over a plurality of sensor element lines are reset into the predetermined reset voltage at a time, and then performs read control after a lapse of a predetermined exposure period so as to allow the sensor detection signals to be sequentially outputted from the respective sensor elements arranged in each of the sensor element lines. Here, the method may further include steps of performing, after the lapse of the exposure period, control of holding the voltage in the storage nodes in the sensor elements over the plurality of sensor element lines at a time so as to be prevented from fluctuation due to the electric charge generated in the photoelectric conversion element, and performing, while the voltage in the storage nodes are maintained in such a hold state, read control so as to allow the sensor detection signals to be sequentially outputted from the respective sensor elements arranged in each of the sensor element lines.

According to another embodiment, there is provided a display device with an input function having a display panel provided with a plurality of display pixels arranged in a matrix form and a plurality of sensor elements arranged in a matrix form, a display drive section driving the plurality of display pixels, and a sensor drive section driving the plurality of sensor elements. Each of the plurality of sensor elements is controlled in a manner similar to the sensor driving section in the sensor device according to the above-described embodiment.

According to another embodiment, there is provided an electronic unit including the display device with the input function according to the above-described embodiment.

In the sensor device, the method of driving the sensor element, the display device with the input function or the electronic unit according to embodiment, the electric charge according to the amount of received light is generated in the photoelectric conversion element. Further, the electric charge converted by the photoelectric conversion element is stored in the storage node, and the voltage value according to the stored electric charge of the storage node is output as the sensor detection signal. The voltage value of the storage node is reset to the predetermined reset voltage by the reset transistor. At that time, the reset transistor is controlled so that the sensor elements are reset over the plurality of lines simultaneously. Subsequently, after the lapse of the predetermined exposure period, the read control is performed so that the sensor detection signals are sequentially output from the sensor elements arranged in each line.

In the sensor device, the method of driving the sensor element, the display device with the input function or the electronic unit according to an embodiment, there is performed such control that the storage nodes of the sensor elements are reset to the predetermined reset voltage over the plurality of lines simultaneously, and subsequently, after the lapse of the predetermined exposure period, the read control is performed so that the sensor detection signals are sequentially output from the sensor elements arranged in each line. Therefore, it may be possible to perform stable detection operation by reducing an influence of a dark current accompanying a change in temperature.

Further, after the lapse of the predetermined exposure period, for the sensor elements over the plurality of lines simultaneously, the voltage value of the storage node is controlled to be in a state of being maintained so that the voltage value of the storage node is prevented from fluctuating due to generation of the electric charge in the photoelectric conversion element, and in the state of the voltage value being maintained, the read control is performed so that the sensor detection signals are sequentially output from the sensor elements arranged in each line. Therefore, it may be possible to perform further stable detection operation.

Additional features and advantages are described herein, and will be apparent from the following Detailed Description and the figures.

BRIEF DESCRIPTION OF THE FIGURES

FIGS. 11A and 11B are a diagram illustrating a state in which a proximity object is in the sensor region when there is strong external light in the display device illustrated in FIG. 1, and a diagram illustrating an example of a sensor output voltage in such a state, respectively;

FIGS. 12A and 12B are a diagram illustrating a state in which a proximity object is in the sensor region when there is weak external light in the display device illustrated in FIG. 1, and a diagram illustrating an example of a sensor output voltage in such a state, respectively;

FIGS. 40A through 40G are diagrams illustrating a fifth application example, namely, FIGS. 40A and 40B are a front view and a side view in an open state, respectively, and FIGS. 40C through 40G are a front view, a left-side view, a right-side view, a top view, and a bottom view in a closed state, respectively.

DETAILED DESCRIPTION

Embodiments of the present application will be described below in detail with reference to the drawings.

Entire Structure of Display Device with Input Function

Figure 1:
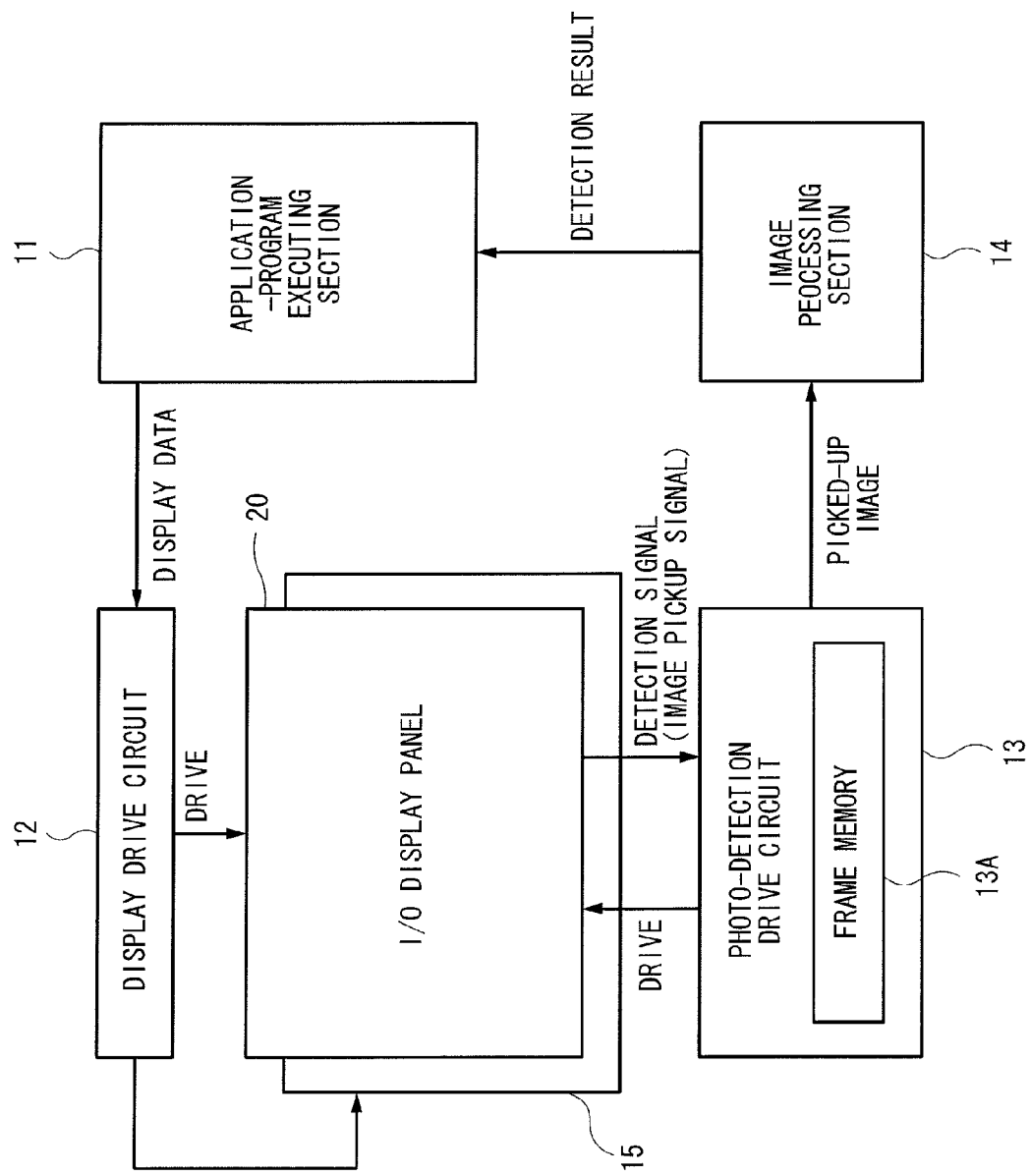
FIG. 1 is a block diagram illustrating a configuration example of a display device with an input function according to an embodiment.

FIG. 1 illustrates an example of the entire structure of a display device (display image-pickup device) with an input function according to an embodiment. This display device includes an I/O display panel 20, a backlight 15, a display drive circuit 12, a photo-detection drive circuit 13, an image processing section 14, and an application-program executing section 11.

Figure 3:
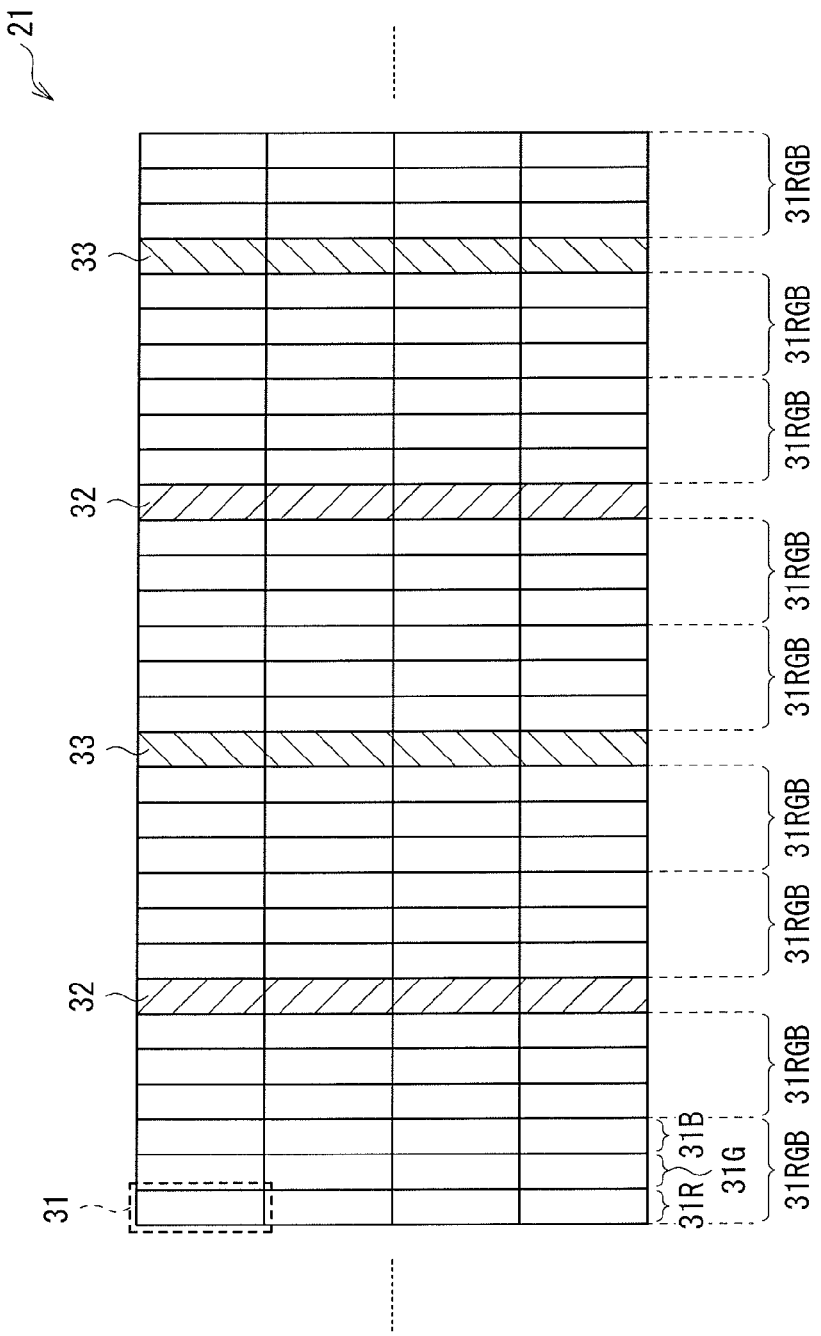
FIG. 3 is a plan view illustrating an example of pixel arrangement in a display region (sensor region) illustrated in FIG. 2.

The I/O display panel 20 is, for example, a Liquid Crystal Display (LCD) panel. The I/O display panel 20 includes plural display pixels 31RGB arranged in a matrix form as illustrated in FIG. 3 to be described later, and has a function of displaying (display function) a predetermined image such as graphics and characters based on display data while line-sequentially operating these display pixels. The I/O display panel 20 further includes a plurality of sensor elements 33 arranged as image pickup pixels in a matrix form as illustrated in FIG. 3 to be described later, and has a function to serve as a sensor panel (detection function, image pickup function) that detects and images an object (proximity object) touching or close to a panel surface.

The backlight 15 is a light source for display and detection in the I/O display panel 20, and includes, for example, arranged plural light-emitting diodes. The backlight 15 is driven and controlled by the display drive circuit 12, and is capable of performing on-off (illuminating and not illuminating) operation at a high speed based on predetermined timing synchronized with operation timing of the I/O display panel 20, which will be described later. The backlight 15 emits illuminating light Lon periodically from a rear side of the I/O display panel 20 toward the panel surface.

The display drive circuit 12 is a circuit driving the display pixels 31RGB of the I/O display panel 20 (i.e. performs driving of line-sequential display operation), so that an image is displayed on the I/O display panel 20 based on display data (i.e. so that display operation is performed). The display drive circuit 12 also performs on-off (illuminating and not illuminating) control of the backlight 15.

The photo-detection drive circuit 13 is a circuit driving the I/O display panel 20 (i.e. performs driving of line-sequential image pickup operation), so that a sensor detection signal (image pickup signal) is obtained from each of the sensor elements (image pickup pixels) 33 of the I/O display panel 20 (i.e. so that an object is detected or imaged). Incidentally, the sensor detection signals (image pickup signals) from the respective sensor elements 33 are stored in a frame memory 13A, for example, per frame, and output to the image processing section 14 as a detected image (picked-up image).

The image processing section 14 performs predetermined image processing (arithmetic processing) based on the picked-up image output from the photo-detection drive circuit 13. As a result of performing the image processing, the image processing section 14 detects and obtains, for example, object information about an object (positional coordinates data, data related to the shape and size of the object, and the like) that has made an approach or the like to the I/O display panel 20.

Based on a detection result obtained by the image processing section 14, the application-program executing section 11 performs processing according to a predetermined piece of application software. As an example of this processing, there is processing of including the positional coordinates of the detected object in the display data to be displayed on the I/O display panel 20. Incidentally, the display data produced by the application-program executing section 11 is supplied to the display drive circuit 12.

Configurational Example of I/O Display Panel 20

Figure 2:
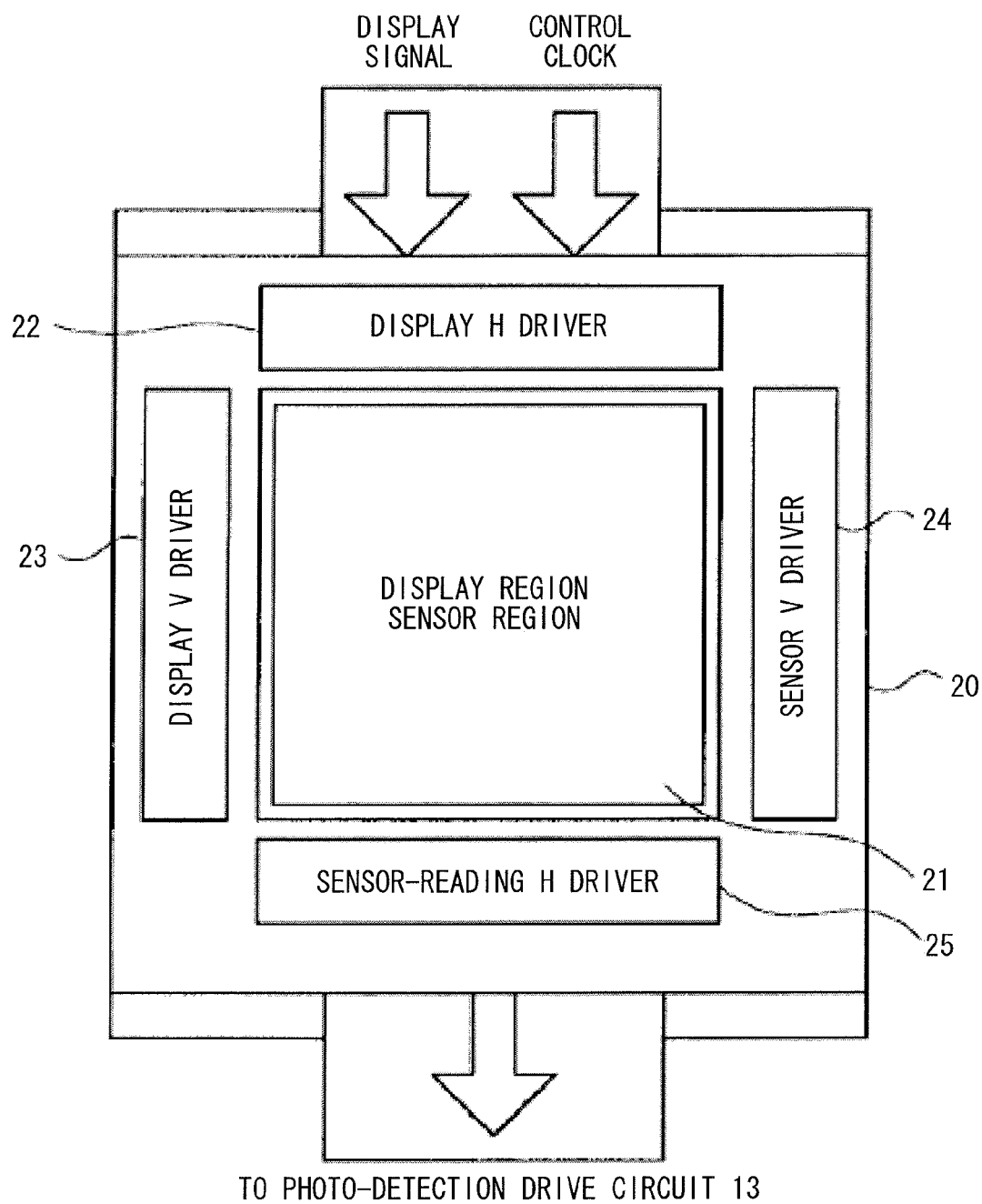
FIG. 2 is a block diagram that illustrates a configurational example of an I/O display panel illustrated in FIG. 1.

FIG. 2 illustrates a configurational example of the I/O display panel 20. The I/O display panel 20 includes a display region (sensor region) 21, a display H driver 22, a display V driver 23, a sensor-reading H driver 25, and a sensor V driver 24.

The photo-detection drive circuit 13, the sensor V driver 24, and the sensor-reading H driver 25 in FIG. 1 and FIG. 2 combined are a specific example of the "sensor driving section" according to the embodiment. The display drive circuit 12, the display H driver 22, and the display V driver 23 combined are a specific example of the "display pixel driving section" according to the embodiment. The I/O display panel 20 is a specific example of the "display panel" and the "sensor panel" according to the embodiment. The photo-detection drive circuit 13 and the image processing section 14 combined are a specific example of the "signal processing section" according to the embodiment.

The display region (sensor region) 21 is a region used to modulate light from the backlight 15 and to emit the modulated light as irradiation light (hereinafter referring to light that includes display light and irradiation light for detection emitted by, for example, an infrared light source (not illustrated)). The display region (sensor region) 21 is also a region used to detect (to image) an object touching or close to this region. In the display region (sensor region) 21, the display pixels 31RGB (e.g. liquid crystal display elements) and the sensor elements 33 that will be described later are arranged in respective matrix forms.

Based on display signals for driving the display and control clocks supplied by the display drive circuit 12, the display H driver 22 line-sequentially drives, together with the display V driver 23, the display pixels 31RGB within the display area 21.

According to driving control by the photo-detection drive circuit 13, the sensor-reading H driver 25, together with the sensor V driver 24, line-sequentially drives the sensor elements 33 serving as the image pickup pixels within the display area 21, and obtains detection signals (image pickup signals). The photo-detection drive circuit 13 is configured to carry out, when the irradiation light is emitted from the backlight 15 to a proximity object, driving control to store electric charge for charging in the sensor elements 33 according to a sum of an amount of reflected light resulting from the irradiation light and an amount of ambient light (external light). Also, the photo-detection drive circuit 13 is configured to carry out, when the irradiation light is not emitted from the backlight 15, driving control to store electric charge for charging in the sensor elements 33 according to an amount of ambient light. The sensor-reading H driver 25 is configured to output, to the photo-detection drive circuit 13, the sensor detection signals (image pickup signals) at the time when the backlight 15 is turned on and off, which are obtained from the sensor elements 33 through these kinds of driving control.

FIG. 3 illustrates a detailed configurational example of each pixel in the display region (sensor region) 21. For example, as illustrated in FIG. 3, pixels 31 of the display region 21 include the display pixels 31RGB, the sensor elements 33 serving as the image pickup pixels and wire sections 32 in which wires for the sensor elements 33 are formed. Each of the display pixels 31RGB includes a display pixel 31R for red (R), a display pixel 31G for green (G) and a display pixel 31B for blue (B). The display pixels 31RGB, the sensor elements 33 and the wire sections 32 are arranged in a matrix form on the display region (sensor region) 21. Further, the sensor elements 33 and the wire sections 32 for driving the sensor elements 33 are arranged to be separated from each other periodically. Thanks to such an arrangement, a sensor region including the sensor elements 33 and the wire sections 32 is extremely hard to recognize relative to the display pixels 31RGB, and a reduction in aperture ratio in the display pixels 31RGB is suppressed to a minimum. Furthermore, when the wire sections 32 are disposed in a region that does not contribute to the aperture of the display pixels 31RGB (for example, a region shielded from light by a black matrix, or a reflection region), it may be possible to dispose a light-receiving circuit without reducing display quality.

Figure 4:
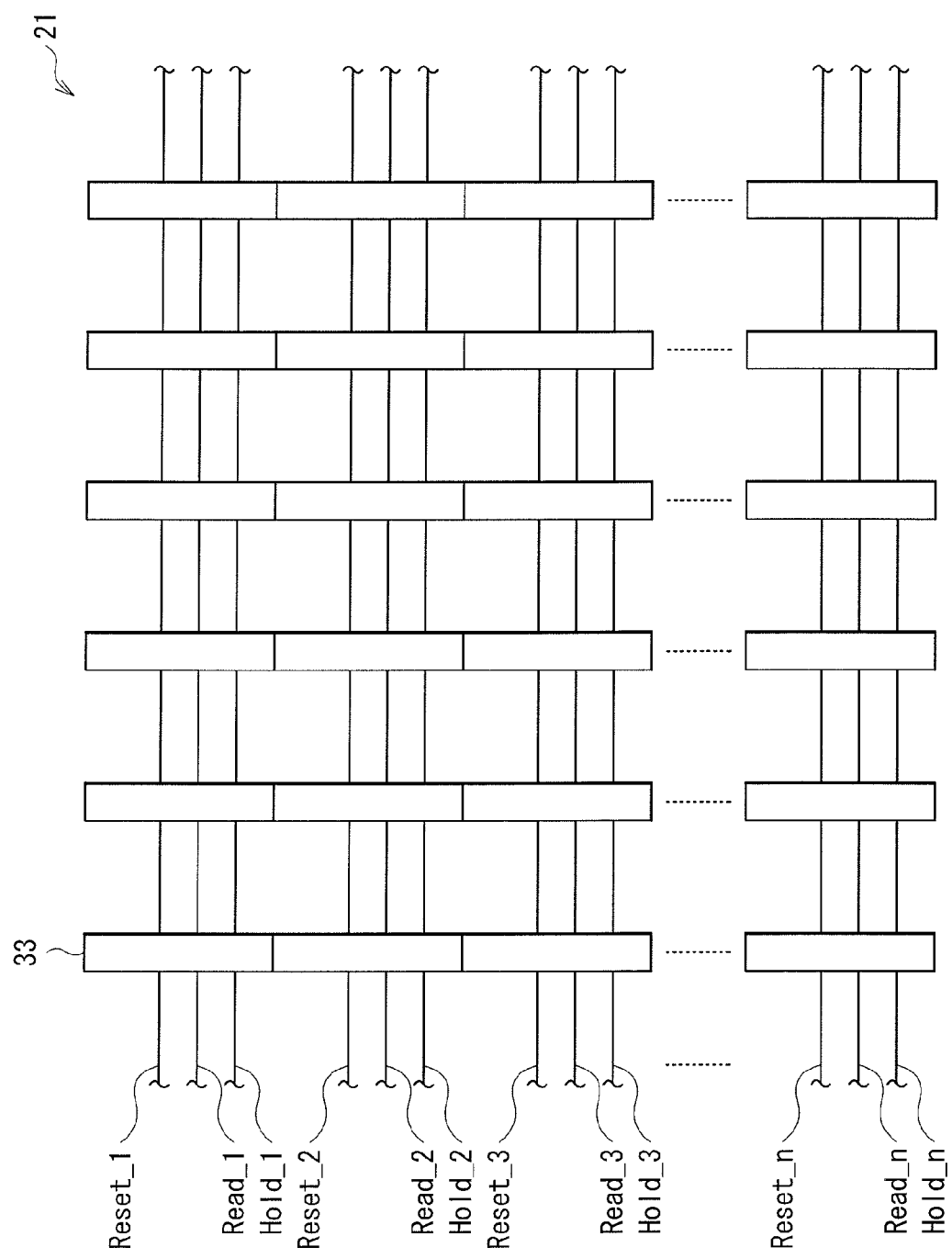
FIG. 4 is a schematic plan view illustrating an example of a connection relation between sensor elements (image pickup pixels) and signal lines in the pixel arrangement illustrated in FIG. 3.

Incidentally, for example, as illustrated in FIG. 4, reset-control signal lines Reset_1 through Reset_n and read-control signal lines Read_1 through Read_n are connected to each of the sensor elements 33, along a horizontal line direction. Also, hold-control signal lines Hold_1 through Hold_n are connected to each of the sensor elements 33, along the horizontal line direction.

Configuration Example of Sensor Elements 33

Figure 5:
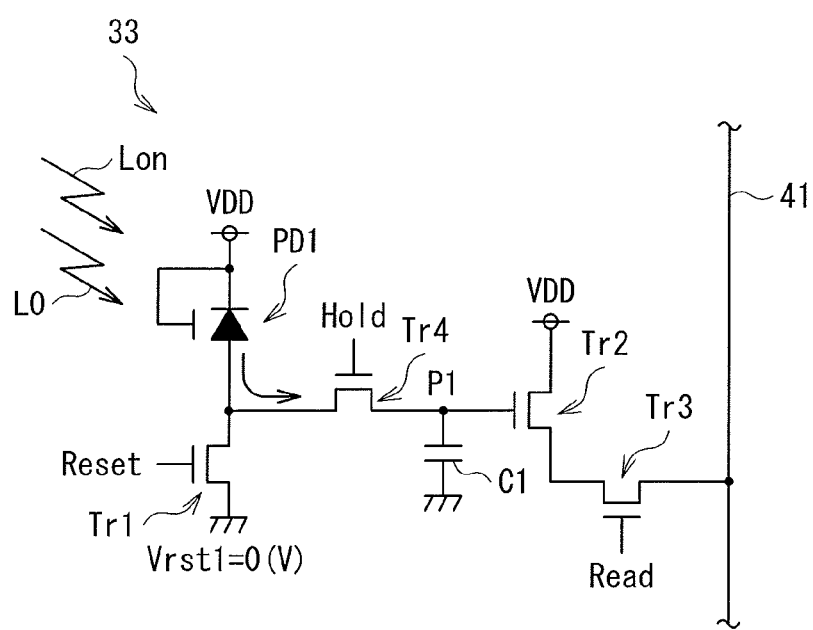
FIG. 5 is a circuit diagram illustrating a configuration example of a sensor element in the display device illustrated in FIG. 1.

For example, as illustrated in FIG. 5, the sensor element 33 includes a photoelectric conversion element PD1, a reset transistor Tr1, a storage node P1, an amplification transistor Tr2 and a select/read transistor Tr3. The sensor element 33 further includes a hold switching transistor Tr4 and a capacitor C1.

The photoelectric conversion element PD1 generates electric charge according to an amount of incident light and is, for example, a PIN photodiode. The PIN photodiode has a p-type semiconductor region, an n-type semiconductor region and an intrinsic semiconductor region (i region) formed between the p-type semiconductor region and the n-type semiconductor region. The photoelectric conversion element PD1 has an anode electrode, a cathode electrode and a gate electrode. When the photoelectric conversion element PD1 is the PIN photodiode, the anode electrode is connected to the p-type semiconductor region, and the cathode electrode is connected to the n-type semiconductor region. The cathode electrode of the photoelectric conversion element PD1 is connected to a power supply line for supplying a power supply voltage VDD. The anode electrode of the photoelectric conversion element PD1 is connected to one end (drain) of the reset transistor Tr1.

When the hold switching transistor Tr4 is in the ON state, the storage node P1 is electrically connected to the anode electrode of the photoelectric conversion element PD1 and the drain of the reset transistor Tr1 via the hold switching transistor Tr4. In the storage node P1, electric charge converted by the photoelectric conversion element PD1 is stored and the voltage changes according to the stored electric charge. In the storage node P1, a storage capacitance is equivalently formed by a parasitic capacitance or the like due to wiring, and the electric charge can be stored based on the storage capacitance. In the present embodiment however, the capacitor C1 for storing electric charge is provided, and one end of the capacitor C1 is connected to the storage node P1. The other end of the capacitor C1 is grounded.

Each of the reset transistor Tr1, the amplification transistor Tr2, the select/read transistor Tr3 and the hold switching transistor Tr4 includes a Thin Film Transistor (TFT) and the like.

A gate of the reset transistor Tr1 is connected to the reset-control signal line Reset (see FIG. 4 and FIG. 5), and a source of the reset transistor Tr1 is connected to a supply line of a reset voltage Vrst1. The drain of the reset transistor Tr1 and a gate of the amplification transistor Tr2 are connected to the storage node P1. A drain of the amplification transistor Tr2 is connected to the power supply line for supplying the power supply voltage VDD. A source of the amplification transistor Tr2 is connected to a drain of the select/read transistor Tr3. A gate of the select/read transistor Tr3 is connected to the read-control signal line Read for supplying a read-control signal, and a source of the select/read transistor Tr3 is connected to a readout line 41.

The reset transistor Tr1 is used to reset the voltage value of the storage node P1 to the reset voltage Vrst1 (to release the electric charge stored in the storage node P1 (capacitor C1)). The reset voltage Vrst1 supplied to the reset transistor Tr1 is set at, for example, 0(V).

The amplification transistor Tr2 and the select/read transistor Tr3 form a source follower, and read the voltage value according to the electric charge stored in the storage node P1 (capacitor C1) and output the read voltage value as the sensor detection signal. The sensor detection signal is output to the readout line 41 at the time when the select/read transistor Tr3 is turned on in response to the read-control signal applied to the gate. The amplification transistor Tr2 and the select/read transistor Tr3 combined are a specific example of the "readout section" according to the present application.

The hold switching transistor Tr4 is interposed between: a connection point between the photoelectric conversion element PD1 and the reset transistor Tr1; and the storage node P1. The hold switching transistor Tr4 is a switching transistor for selectively causing an electrically high impedance between the photoelectric conversion element PD1 and the storage node P1. A source of the hold switching transistor Tr4 is connected to the connection point between the photoelectric conversion element PD1 and the reset transistor Tr1. A gate of the hold switching transistor Tr4 is connected to the hold-control signal line Hold, and subjected to on-off control by a hold-control signal from the photo-detection drive circuit 13.

The photo-detection drive circuit 13 controls the impedance between the photoelectric conversion element PD1 and the storage node P1 by performing on-off control of the hold switching transistor Tr4. Further, the photo-detection drive circuit 13 controls the reset transistor Tr1 so that the sensor elements 33 over plural lines are reset at the same time. Subsequently, after a lapse of a predetermined exposure period, the photo-detection drive circuit 13 performs control so that the electrically high impedance is caused between the photoelectric conversion element PD1 and the storage node P1 simultaneously for the sensor elements 33 over plural lines, and in the state of the high impedance, the photo-detection drive circuit 13 also performs readout control so that the sensor detection signals are sequentially output from the sensor elements 33 arranged in each line.

Wiring Layout of Sensor Element 33

Figure 6:
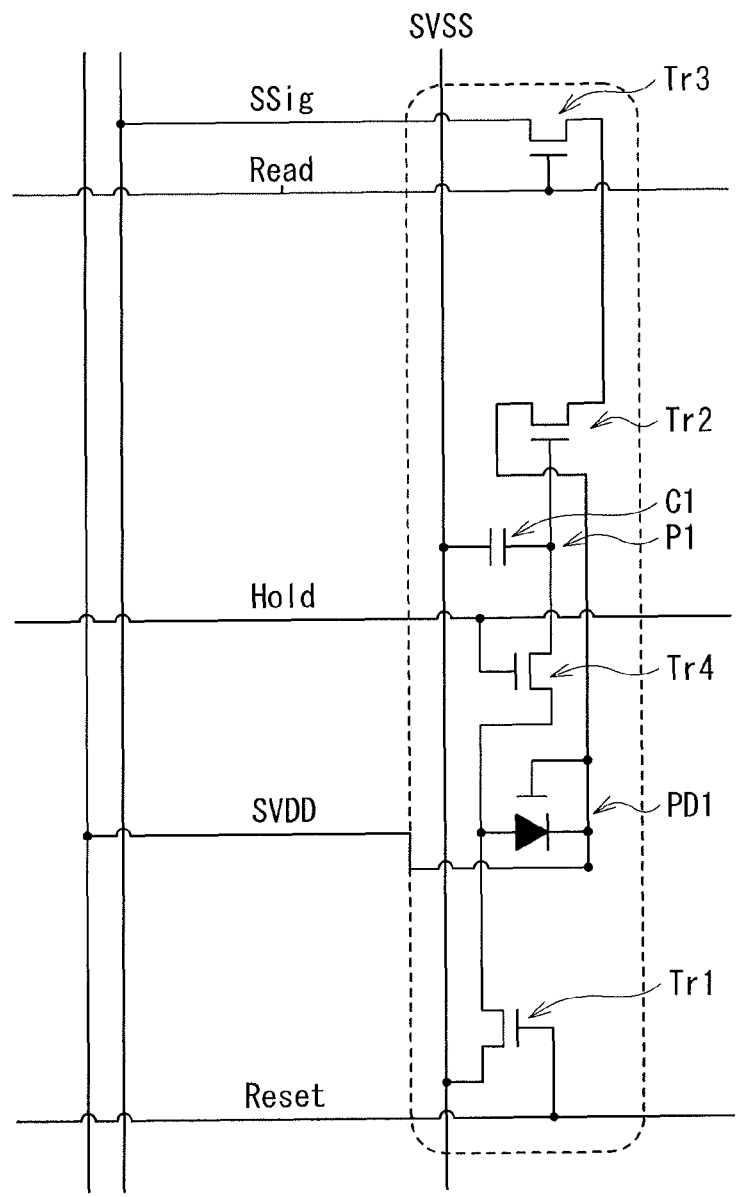
FIG. 6 is a circuit diagram illustrating a configuration example of a wiring layout of the sensor element.
Figure 7:
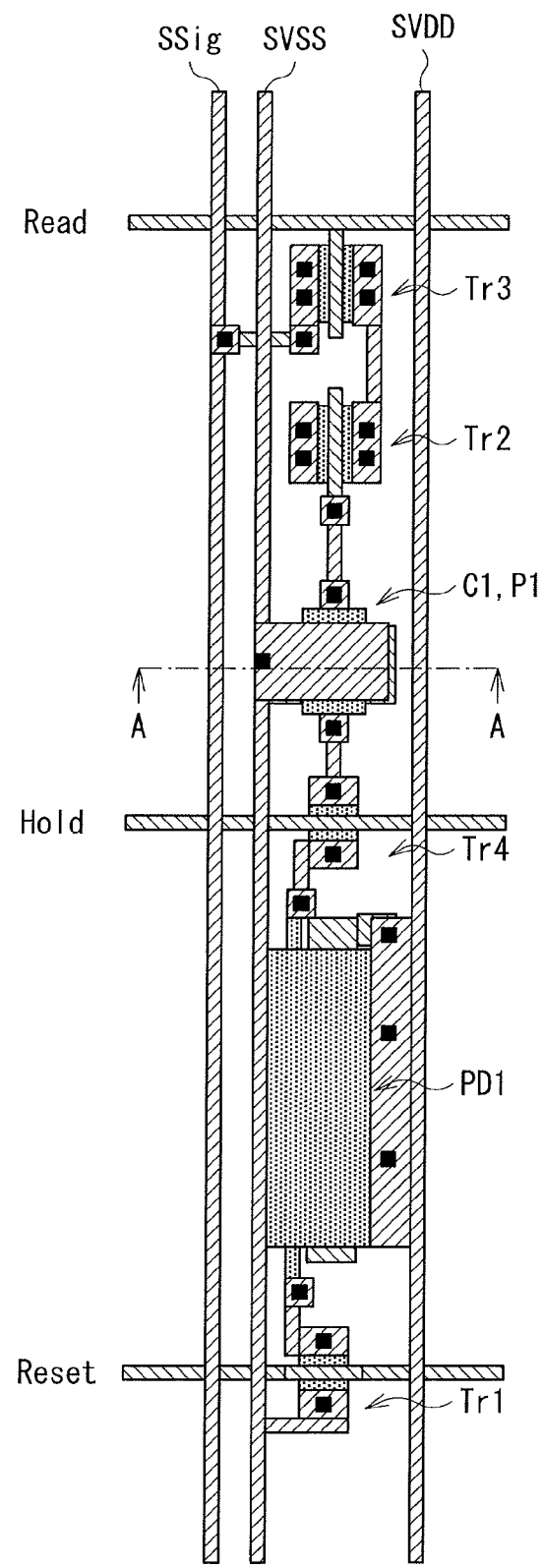
FIG. 7 is a plan view illustrating a wiring structure corresponding to the wiring layout in FIG. 6.

FIG. 6 illustrates a configurational example of the wiring layout of the sensor element 33. FIG. 7 illustrates a wiring structure corresponding to the wiring layout in FIG. 6. In FIG. 6 and FIG. 7, SVDD is the power supply line for supplying the power supply voltage VDD. SVSS is a supply line for supplying the reset voltage Vrst1. Ssig is the readout line 41 to which the sensor detection signal is output.

Figure 8:
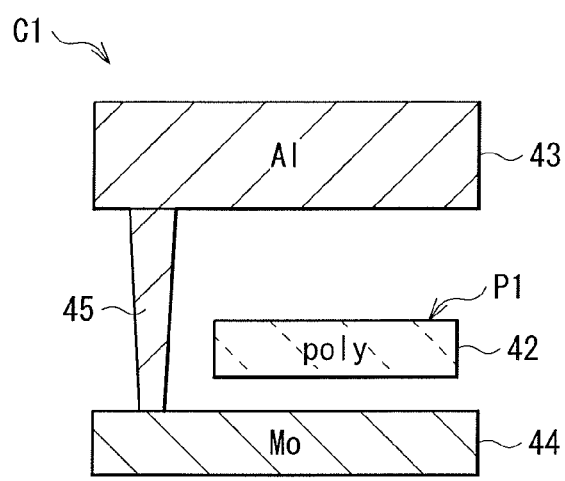
FIG. 8 is a cross-sectional diagram illustrating a structure of a part forming a capacitor C1 in the wiring structure in FIG. 7.

FIG. 8 illustrates a cross-sectional structure (a cross section taken along a line AA in FIG. 7) of a part forming the capacitor C1 in the wiring structure in FIG. 7. The capacitor C1 is configured to have a first electrode 42 formed by the storage node P1 and a second electrode formed to sandwich the storage node P1 from upper side and lower side with predetermined space in between. In FIG. 8, the second electrode is formed by an upper electrode 43 arranged above the first electrode 42 with predetermined space in between, a lower electrode 44 arranged below the first electrode 42 with pre-determined space in between, and a contact electrode 45 that brings the upper electrode 43 and the lower electrode 44 into conduction. The upper electrode 43 and the contact electrode 45 are made of, for example, Al (aluminum), and the lower electrode 44 is made of, for example, Mo (molybdenum). The first electrode 42 is made of, for example, poly (polysilicon).

Providing the structure of the second electrode in the capacitor C1 as illustrated in FIG. 8 makes the storage node P1 to be in a state of being shielded and thus, it may be possible to reduce stray noise entering the storage node P1.

Configurational Example of Control Buffer

Figure 19:
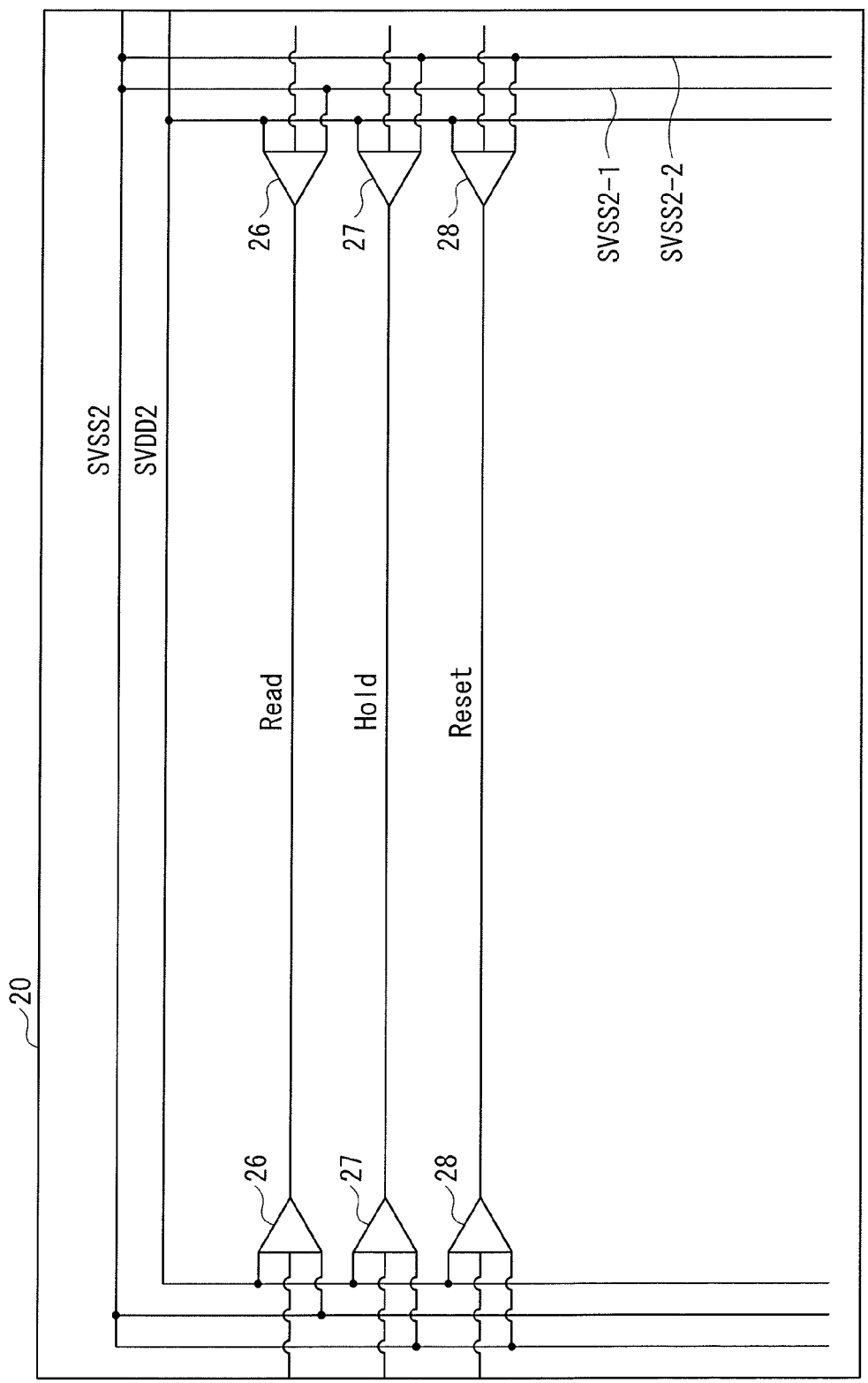
FIG. 19 is an explanatory diagram illustrating a configuration example of a power line of a control buffer of the sensor element.

FIG. 19 illustrates a configurational example of a power supply line of a control buffer of the sensor element 33. The photo-detection drive circuit 13 has, for each line, a read-control buffer 26, a hold-control buffer (switching-control buffer) 27, and a reset-control buffer 28. The read-control buffer 26 outputs, for each line, a read-control signal for controlling the select/read transistor Tr3 of the sensor element 33. The hold-control buffer 27 outputs, for each line, a switching control signal for controlling the hold switching transistor Tr4. The reset-control buffer 28 outputs, for each line, a reset-control signal for controlling the reset transistor Tr1.

In FIG. 19, SVDD2 is a buffer positive supply line, and SVSS2 is a buffer negative power line. It is desirable that the read-control buffer 26 be connected to a negative power line independently of the hold-control buffer 27 and the reset-control buffer 28. In FIG. 19, the buffer negative power line SVSS2 is divided into a buffer first negative power line SVSS2-1 and a buffer second negative power line SVSS2-2. The buffer first negative power line SVSS2-1 serves as a negative power line dedicated to the read-control buffer 26. As a result, it may be possible to reduce an influence of power supply noise that is produced at the time of processing during a Reset period and processing during a Hold period which will be described later, and exerted upon the storage node P1.

Figure 20A:
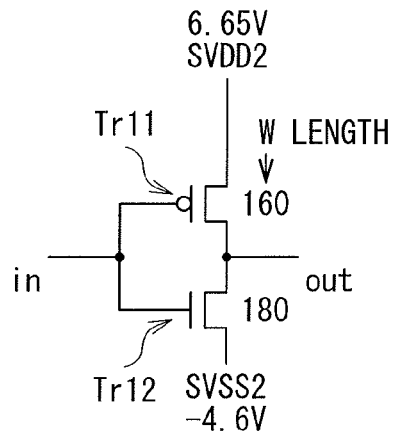
FIGS. 20A and 20B are a circuit diagram illustrating a configuration example of a comparative example for a hold-control buffer and a reset-control buffer, and a diagram that illustrates a waveform of an input signal into the circuit in FIG. 20A, respectively.
Figure 21A:
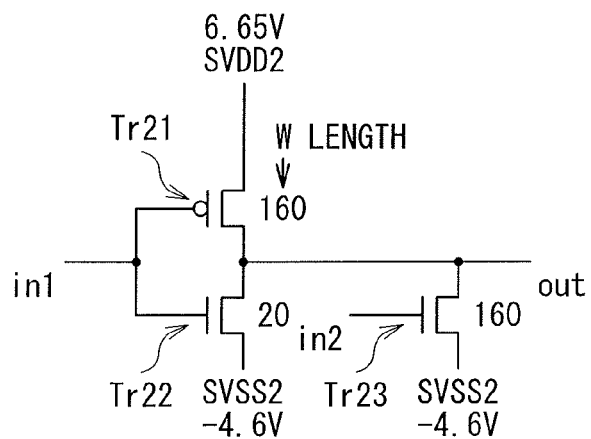
FIGS. 21A and 21B are a circuit diagram illustrating a first configuration example of the hold-control buffer and the reset-control buffer, and a diagram that illustrates waveforms of input signals into the circuit in FIG. 21A, respectively.

FIG. 21A illustrates a first configurational example of the hold-control buffer 27 and the reset-control buffer 28. FIG. 20A illustrates a comparative example for the hold-control buffer 27 and the reset-control buffer 28.

Figure 20B:

A circuit of the comparative example in FIG. 20A includes a first transistor Tr11 for making an output signal to be high and a second transistor Tr12 for making the output signal to be low. FIG. 20B illustrates a waveform of an input signal into this circuit. In FIG. 20A, numerical values (160, 180) beside the first and second transistors Tr11 and Tr12 each indicate W length as a transistor element.

Figure 21B:
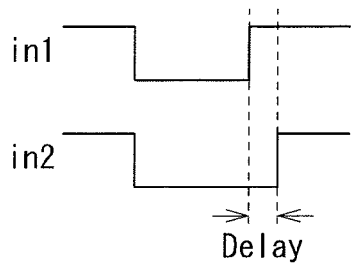

A circuit of the first configurational example in FIG. 21A includes a first transistor Tr21 for making an output signal to be high, a second transistor Tr22 for making the output signal to be low, and a third transistor Tr23 having an electric current driving capability higher than that of the second transistor Tr22 and for making the output signal to be low. FIG. 21B illustrates waveforms of input signals into this circuit. In FIG. 21A, numerical values (160, 20, 160) beside the first, second and third transistors Tr21, Tr22 and Tr23 each indicate W length as a transistor element. The third transistor Tr23 is configured to have the W length larger than that of the second transistor Tr22 and thus has the higher electric current driving capability.

Figure 22A:
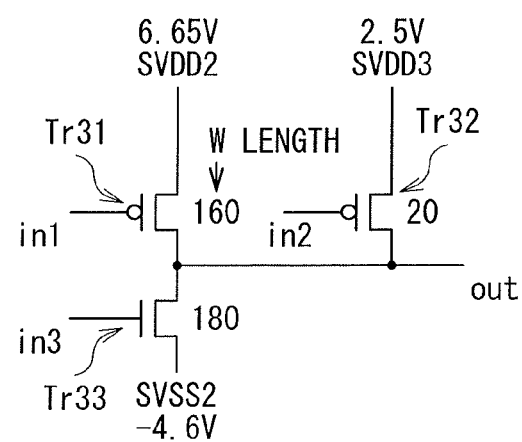
FIGS. 22A and 22B are a circuit diagram illustrating a second configuration example of the hold-control buffer and the reset-control buffer, and a diagram that illustrates waveforms of input signals into the circuit in FIG. 22A, respectively.
Figure 22B:
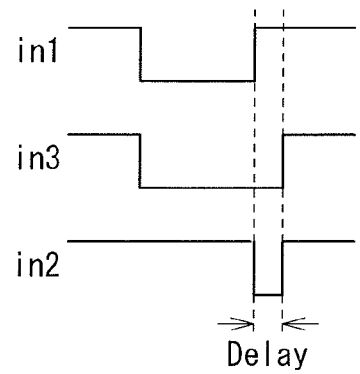

FIG. 22A illustrates a second configurational example of the hold-control buffer 27 and the reset-control buffer 28. Like the first configurational example in FIG. 21A, a circuit of this second configurational example also includes a first transistor Tr31 for making an output signal to be high, a second transistor Tr32 for making the output signal to be low, and a third transistor Tr33 having an electric current driving capability higher than that of the second transistor Tr32 and for making the output signal to be low. To the circuit of this second configurational example, two positive supply lines SVDD2 and SVDD3 and one negative power line SVSS2 are connected. The first transistor Tr31, the second transistor Tr32 and the third transistor Tr33 are respectively connected to power supply lines of different supply voltages. FIG. 22B illustrates waveforms of input signals into this circuit. In FIG. 22A, numerical values (160, 20, 180) beside the first, second and third transistors Tr31, Tr32 and Tr33 each indicate W length as a transistor element. The third transistor Tr33 is configured to have the W length larger than that of the second transistor Tr32 and thus has the higher electric current driving capability.

In the first configurational example in FIG. 21A, when the output signal is inverted from high to low, the second transistor Tr22 is caused to be ON at first and subsequently, the third transistor Tr23 is caused to be ON so that signal inversion is carried out stepwise. Inversion is carried out similarly in the second configurational example in FIG. 22A as well. This makes it possible to decrease the electric current that flows when the signal voltage changes and reduce the power supply noise.

Operation of Display Device

First, a summary of image display operation and object detection operation (image pickup operation) by this display device will be described.

In this display device, based on display data supplied by the application-program executing section 11, the display drive circuit 12 generates a drive signal for display. Based on this drive signal, the I/O display panel 20 is line-sequentially driven, and an image is displayed. At this time, the backlight 15 is also driven by the display drive circuit 12, so that periodical turning on and off operation is performed in synchronization with the I/O display panel 20.

When there is an object (a proximity object such as a finger) touching or close to the I/O display panel 20, the object is detected (imaged) by the sensor elements (image pickup pixels) 33 in the I/O display panel 20 through linear sequential image-pickup driving by the photo-detection drive circuit 13. A detection signal (image pickup signal) from each of the sensor elements 33 is supplied from the I/O display panel 20 to the photo-detection drive circuit 13. The photo-detection drive circuit 13 accumulates the detection signals of the sensor elements 33 for one frame and outputs the accumulated detection signals to the image processing section 14 as a picked-up image. Here, two frame images are output to the image processing section 14, namely, an image based on the sensor detection signals from the sensor elements 33 obtained when the backlight 15 is in the ON state, and an image based on the sensor detection signals from the sensor elements 33 obtained when the backlight 15 is in the OFF state.

The image processing section 14 obtains object information about the object (such as positional coordinates data and data related to the shape and size of the object) touching or close to the I/O display panel 20, by performing predetermined image processing (arithmetic processing) based on this picked-up image. For example, the arithmetic processing to determine a barycenter of a differential image produced in the photo-detection drive circuit 13 is performed, and a contact (approach) center is identified. Subsequently, a result of detecting the proximity object is output from the image processing section 14 to the application-program executing section 11. The application-program executing section 11 executes an application program as will be described later.

Details of Sensor Operation

Figure 9:
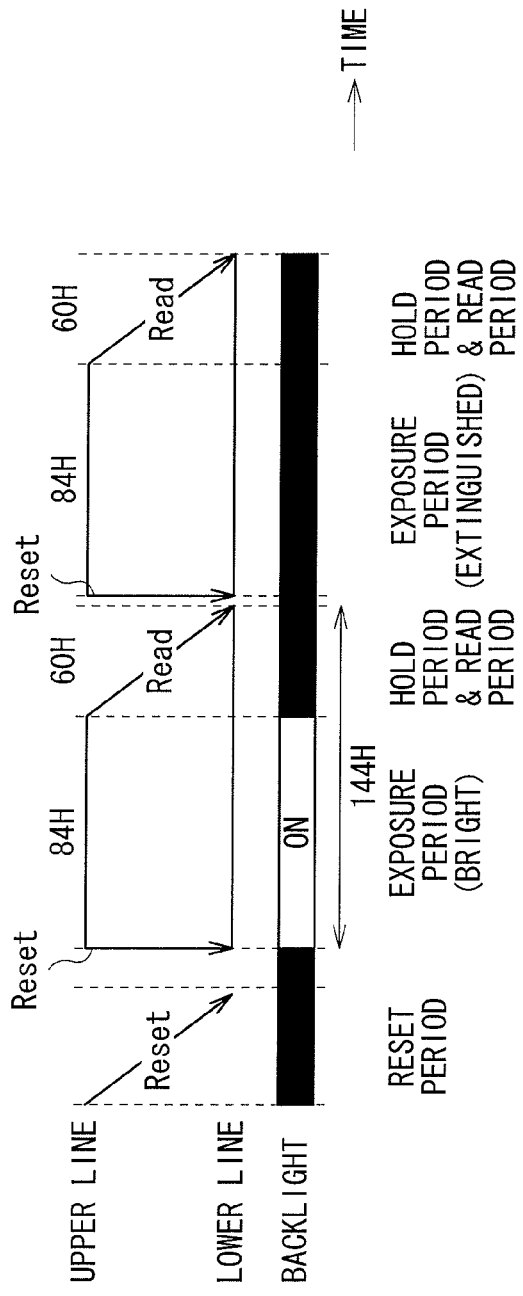
FIG. 9 is a timing chart representing an example of sensor operation (image-pickup operation) in the display device depicted in FIG. 1.

FIG. 9 illustrates an example of sensor operation (image-pickup operation) in this display device. Each arrow extending from top to bottom illustrated in an upper part of FIG. 9 schematically shows driving timing of the sensor element 33 in the I/O display panel 20. A lateral direction corresponds to time, while a vertical direction corresponds to a scanning line of the I/O display panel 20. In a lower part of this driving timing chart, the on-off state of the backlight 15 is schematically illustrated. In the part showing the on-off state of the backlight 15, black portions indicate that the backlight 15 is off. Incidentally, in FIG. 9, "H" corresponds to an image-pickup (detection) period for one horizontal line. This example shows a case where the sensor elements 33 are provided for 60 lines in a vertical direction. Therefore, for example, 60H corresponds to a period during which line-sequential imaging (detection) for one screen is performed.

First, in an initial state, the photo-detection drive circuit 13 (FIG. 1) performs processing for resetting the voltage value of the storage node P1 in the sensor element 33 with the predetermined reset voltage Vrst1, sequentially from upper to lower lines (Reset period). However, this initial Reset period may be omitted. Moreover, the operation in this initial Reset period may be operation for resetting plural lines collectively at the same time, in a manner similar to the next Reset period.

Next, from upper to lower lines, there is performed processing for resetting the voltage values of the storage nodes P1 in the sensor elements 33 in each line collectively at the same time with the predetermined reset voltage Vrst1 (Reset period). Subsequently, in a state in which the backlight 15 is on, exposure (storage of electric charge converted by the photoelectric conversion element PD1 in the storage node P1 (capacitor C1)) is performed (exposure period (bright)). Incidentally, in the sensor element 33 in each line, during the Reset period and the Exposure period (bright), the hold switching transistor Tr4 is controlled to be ON.

Subsequently, from upper to lower lines, the hold switching transistor Tr4 is controlled to be OFF. As a result, collectively and concurrently for the sensor elements 33 in each line, the impedance between the photoelectric conversion element PD1 and the storage node P1 is controlled to become electrically higher than the impedance during the exposure period. By allowing the high impedance state, the voltage value of the storage node P1 is controlled to hold the voltage so that the voltage value of the storage node P1 is prevented from fluctuation even when electric charge is generated in the photoelectric conversion element PD1 due to an influence of a dark current or the like. In this high impedance state (the state in which the voltage value is maintained), from upper to lower lines sequentially, processing for reading the voltage value of the storage node P1 in the sensor element 33 as the sensor detection signal is performed (Hold period and Read period).

Next, again, from upper to lower lines, there is performed the processing for resetting the voltage values of the storage nodes P1 in the sensor elements 33 in each line collectively at the same time with the predetermined reset voltage Vrst1 (Reset period). Subsequently, in the state in which the backlight 15 is off, exposure (storage of electric charge converted by the photoelectric conversion element PD1 in the storage node P1 (capacitor C1)) is performed (exposure period (extinguished)). Incidentally, in the sensor element 33 in each line, during the Reset period and the Exposure period (extinguished), the hold switching transistor Tr4 is controlled to be ON.

Subsequently, again, from upper to lower lines, the hold switching transistor Tr4 is controlled to be OFF. As a result, collectively and concurrently for the sensor elements 33 in each line, the impedance between the photoelectric conversion element PD1 and the storage node P1 is controlled to become electrically higher than the impedance during the exposure period. By causing the high impedance state, the voltage value of the storage node P1 is controlled to be in the state of being maintained so that the voltage value of the storage node P1 does not change even when the electric charge is generated in the photoelectric conversion element PD1 by the influence of the dark current or the like. In this high impedance state (the state in which the voltage value is maintained), from upper to lower lines sequentially, processing for reading the voltage value of the storage node P1 in the sensor element 33 as the sensor detection signal is performed (Hold period and Read period).

As described above, there are performed the exposure in the state in which the backlight 15 is on and the exposure in the state in which the backlight 15 is off, while the Reset period for collective reset is provided in between. Further, while the impedance between the photoelectric conversion element PD1 and the storage node P1 is controlled to become electrically high (to be in the state in which the voltage value is maintained so that the voltage value of the storage node P1 does not change due to generation of the electric charge in the photoelectric conversion element PD1), the processing for reading the sensor detection signal in each state is performed. Afterwards, this series of processing is sequentially repeated.

Figure 10:
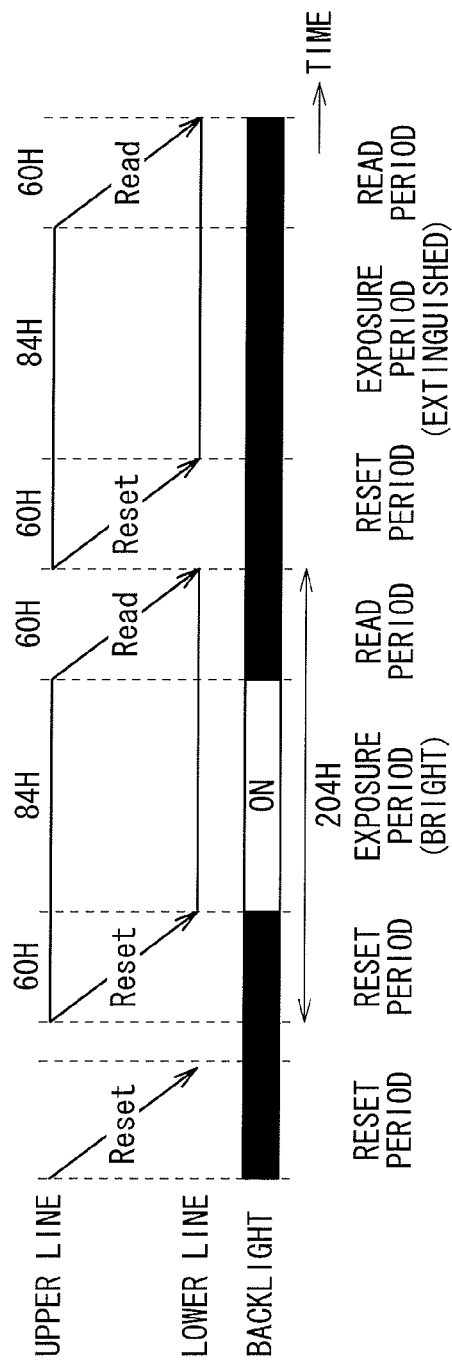
FIG. 10 is a timing chart representing an example of sensor operation (image-pickup operation) in a comparative example.
Figure 18:
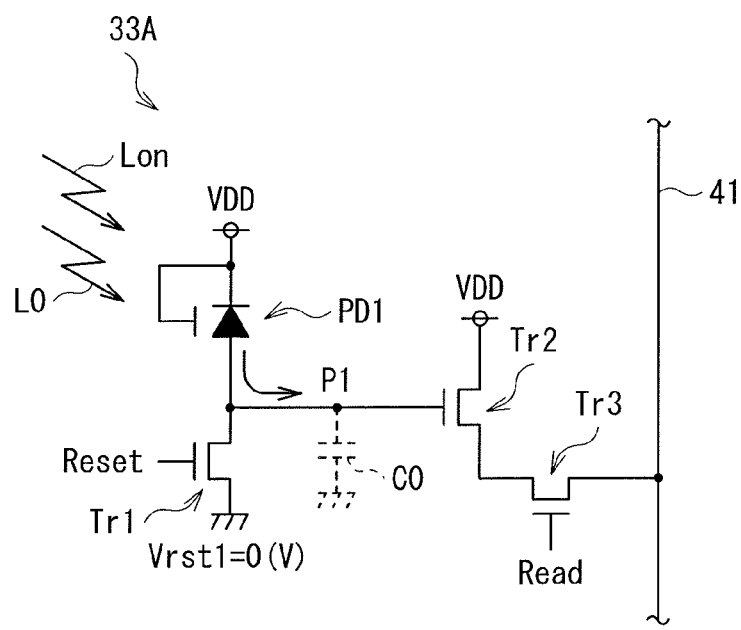
FIG. 18 is a circuit diagram illustrating a configuration example of a sensor element according to the comparative example.

FIG. 10 illustrates a comparative example in comparison with the sensor operation (image-pickup operation) in FIG. 9. This comparative example shows operation in a case in which the sensor element 33 is configured as illustrated in FIG. 18. In a sensor element 33A illustrated in FIG. 18, as compared to the structure in the sensor element 33 in FIG. 5, the hold switching transistor Tr4 and the capacitor C1 are omitted. In the sensor element 33A according to this comparative example, a storage capacity C0 is equivalently formed in the storage node P1 by a parasitic capacitance or the like due to wiring. Electric charge is stored based on this storage capacitance C0.

In the sensor operation in FIG. 9, there is performed the processing for resetting the voltage values of the storage nodes P1 in the sensor elements 33 in each line collectively at the same time. In contrast, in the comparative example of FIG. 10, processing for resetting the voltage value of the storage node P1 in the sensor element 33A with the predetermined reset voltage Vrst1 is performed sequentially from upper to lower lines (Reset period). Subsequently, in the state in which the backlight 15 is on, exposure (storage of electric charge converted by the photoelectric conversion element PD1 in the storage node P1) is performed (exposure period (bright)). Next, from upper to lower lines sequentially, processing for reading the voltage value of the storage node P1 in the sensor element 33A as the sensor detection signal is performed (Read period). Incidentally, in the sensor element 33A according to the comparative example, since the hold switching transistor Tr4 is not provided, the processing during the Hold period in the sensor operation in FIG. 9 is not performed.

Next, again, from upper to lower lines sequentially, there is performed the processing for resetting the voltage value of the storage node P1 in the sensor element 33A with the predetermined reset voltage Vrst1 (Reset period). Subsequently, in the state in which the backlight 15 is off, exposure (storage of electric charge converted by the photoelectric conversion element PD1 in the storage node P1) is performed (exposure period (extinguished)). Next, from upper to lower lines sequentially, processing for reading the voltage value of the storage node P1 in the sensor element 33A as the sensor detection signal is performed (Read period).

As described above, in the comparative example in FIG. 10, there are performed the exposure in the state in which the backlight 15 is on and the exposure in the state in which the backlight 15 is off, while the Reset period is provided in between. Therefore, the processing for reading the sensor detection signal in each state is performed. Afterwards, this series of processing is sequentially repeated.

Specific Example of Detection of Proximity Object

FIG. 11A illustrates a state in which a proximity object (finger f) is in the sensor region 21 of the I/O display panel 20 when there is strong external light L0, and FIG. 11B illustrates an example of a sensor output voltage (photo-detection output voltage) in such a state. For example, when incident external light (ambient light) L0 is strong as illustrated in FIG. 11A, a photo-detection output voltage Von101 in a state in which the backlight 15 is on is as illustrated in FIG. 11B. In other words, the photo-detection output voltage Von101 is a voltage value Va corresponding almost only to the intensity of the ambient light L0 in any part other than a part touched by the finger f within the sensor region 21 on the panel. Further, at the part touched by the finger f, the photo-detection output voltage Von101 is reduced to a voltage value Vb corresponding to the intensity of irradiation light Lon emitted from the backlight 15 and reflected off a surface of the finger f. In contrast, a photo-detection output voltage Voff101 in a state in which the backlight 15 is off is, similarly, the voltage value Va according to the intensity of the external light L0 in the parts other than the part touched by the finger f, but at the part touched by the finger f, the external light L0 is almost in a state of being blocked and thus, the photo-detection output voltage Voff101 is a voltage value Vc at an extremely low level.

FIG. 12A illustrates a state in which a proximity object (finger f) is in the sensor region 21 of the I/O display panel 20 when the external light L0 is weak in the display device, and FIG. 12B illustrates an example of the sensor output voltage (photo-detection output voltage) in such a state. For example, in a state in which the incident external light L0 is weak (almost absent) as illustrated in FIG. 12A, a photo-detection output voltage Von201 in the state in which the backlight 15 is on is as illustrated in FIG. 12B. In other words, in any part other than the part touched by the finger f within the sensor region 21, the photo-detection output voltage Von201 is the voltage value Vc at the extremely low level because the external light L0 is weak. Moreover, at the part touched by the finger f in the sensor region 21, the photo-detection output voltage Von201 is increased to the voltage value Vb corresponding to the intensity of the irradiation light Lon emitted from the backlight 15 and reflected off the surface of the finger f. In contrast, at both of the part touched by the finger f and the other parts, a photo-detection output voltage Voff201 in the state in which the backlight 15 is off remains unchanged at the voltage value Vc at an extremely low level.

Thus, at the part untouched by the finger f in the sensor region 21, there is a great difference in terms of photo-detection output voltage between when the external light L0 is present and when the external light L0 is absent. In contrast, at the part touched by the finger f in the display region 21, the voltage value Vb at the time when the backlight 15 is on and the voltage value Vc at the time when the backlight 15 is off remain approximately the same regardless of the presence or absence of the external light L0. Therefore, by detecting a difference between a voltage at the time when the backlight 15 is on and a voltage at the time when the backlight 15 is off, it may be possible to determine that a part, in which there is a difference not lower than a certain level such as the difference between the voltage value Vb and the voltage value Vc, is a part where there is an approach or the like of an object.

Figure 13:
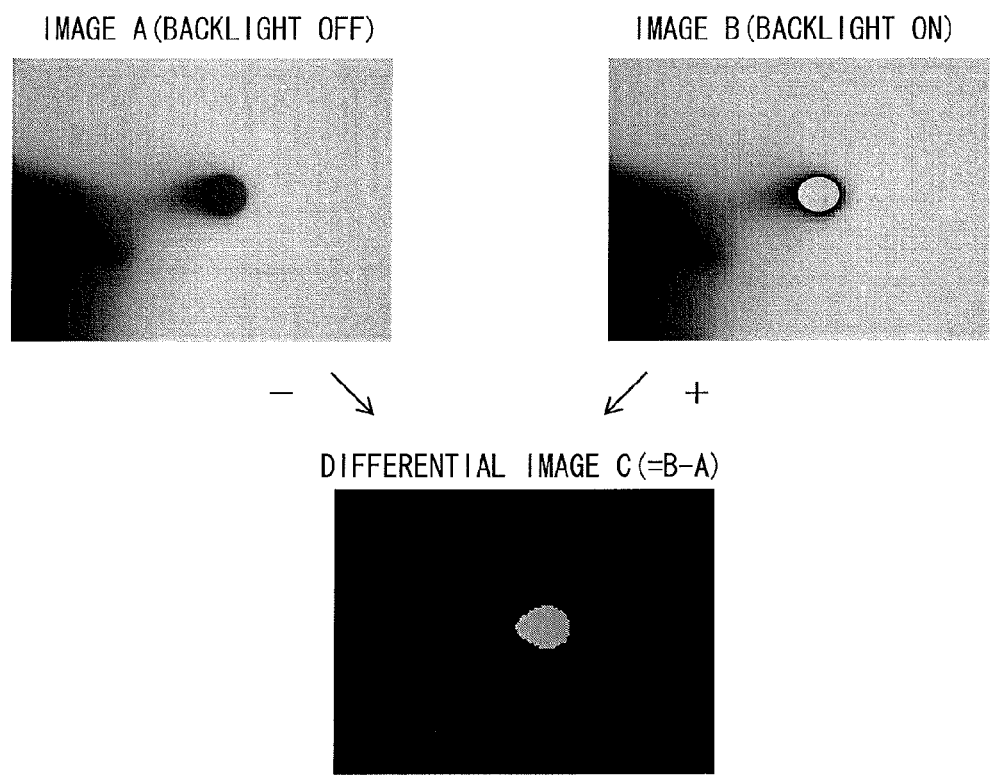
FIG. 13 is a diagram showing images for describing a method of detecting a proximity object by using a differential image.

In the image processing section 14 (FIG. 1), for example, a differential image C as illustrated in FIG. 13 is obtained. An image B is an example of the image based on the sensor detection signals from the sensor elements 33 obtained in a state in which the illuminating light Lon is emitted by the backlight 15. An image A is an example of the image based on the sensor detection signals from the sensor elements 33 obtained in a state in which the illuminating light Lon is not emitted by the backlight 15. It may be possible to detect the position and the like of an object based on the differential image C between the image A and the image B.

Characteristic Change Due to Temperature

Figure 14:
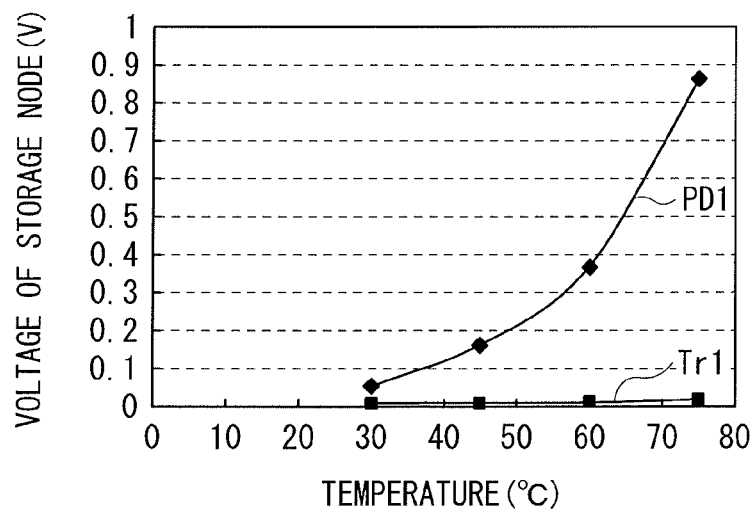
FIG. 14 is a graph illustrating a characteristic of a change in the voltage of a storage node due a temperature rise in the sensor element.

FIG. 14 illustrates a change in the voltage of the storage node P1 with a temperature rise in the sensor element 33. Incidentally, FIG. 14 shows a characteristic in a state in which incident light is absent in the sensor element 33 (dark state). A horizontal axis indicates the temperature while a vertical axis indicates the voltage of the storage node P1. FIG. 14 illustrates a change in the voltage of the storage node P1 when there is a temperature rise in the photoelectric conversion element PD1 and a change in the voltage of the storage node P1 when there is a temperature rise in the reset transistor Tr1. As apparent from FIG. 14, the temperature rise in the photoelectric conversion element PD1 affects the voltage of the storage node P1. On the other hand, the temperature rise in the reset transistor Tr1 has almost no influence on the voltage of the storage node P1.

Figure 15:
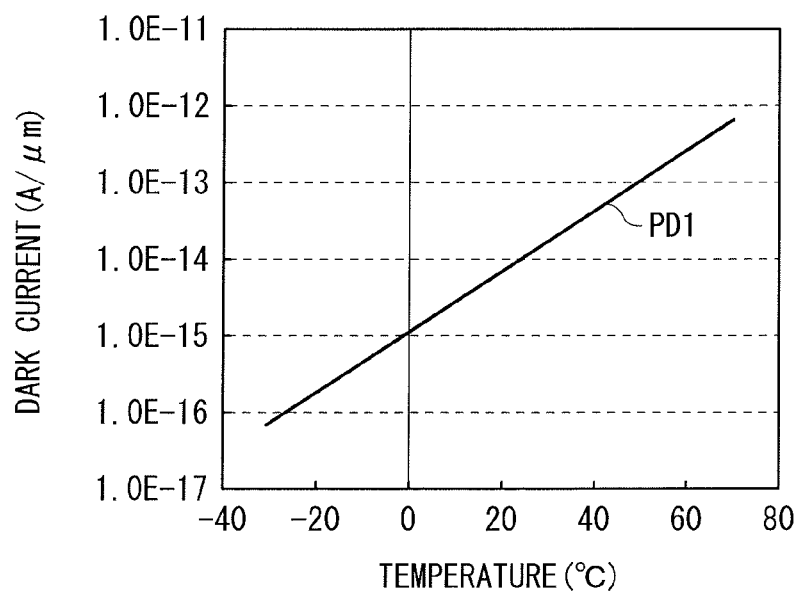
FIG. 15 is a graph illustrating a temperature characteristic of a photoelectric conversion element alone.

FIG. 15 shows a temperature characteristic of the photoelectric conversion element PD1 alone. Incidentally, FIG. 15 shows the characteristic in a state in which incident light is absent in the photoelectric conversion element PD1 (dark state). In other words, FIG. 15 shows a temperature characteristic of the dark current in the photoelectric conversion element PD1. As illustrated in FIG. 15, the dark current (thermally stimulated current) flows in the photoelectric conversion element PD1 even in a state of no incident light. However, this dark current has such a characteristic that the dark current changes with temperature and the amount of flowing current increases as the temperature rises. Since this dark current is present, a change in the voltage of the storage node P1 due to the temperature takes places as illustrated in FIG. 14. In particular, when the temperature becomes high, an influence of the dark current becomes large, increasing the voltage of the storage node P1 and thus leading to a saturated state of the storage node P1, which may adversely affect the detection operation for serving as the sensor.

In the present embodiment, the influence of the dark current accompanying this temperature change is reduced by performing sensor driving by the driving method illustrated in FIG. 9.

Figure 16:
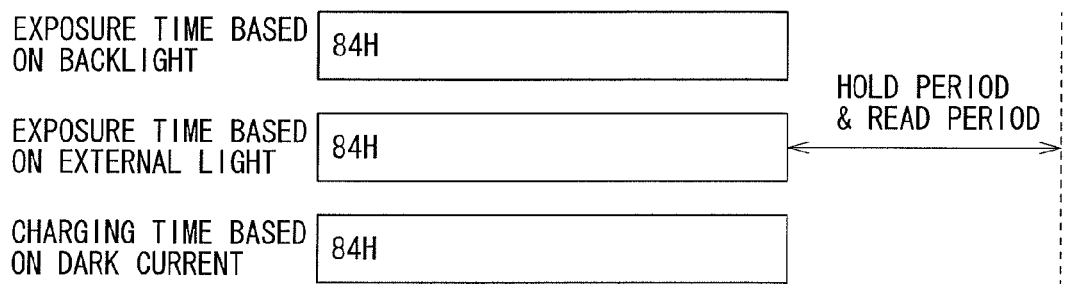
FIG. 16 is an explanatory diagram illustrating exposure time when sensor driving is performed by a driving method shown in FIG. 9.
Figure 17:
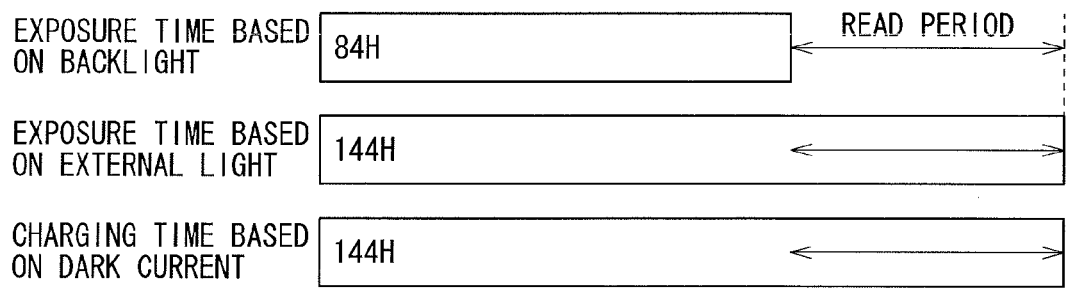
FIG. 17 is an explanatory diagram illustrating exposure time when sensor driving is performed by a driving method according to the comparative example shown in FIG. 10.

FIG. 16 illustrates exposure time when sensor driving is performed by the driving method shown in FIG. 9. FIG. 17 illustrates exposure time when sensor driving is performed by the driving method according to the comparative example shown in FIG. 10. In the driving method according to the comparative example, the Hold period is not included and thus, storage of electric charge due to the external light L0 and the dark current occurs in the storage node P1 during the Read period as well. In contrast, in the driving method shown in FIG. 9, the Read period also serves as the Hold period, and the impedance between the photoelectric conversion element PD1 and the storage node P1 is controlled to become electrically high. As a result, storage of electric charge due to the dark current and the like is suppressed.

In this way, according to the display device with the input function of the present embodiment, the sensor elements 33 are controlled to be reset over plural lines at the same time and then, after a lapse of a predetermined exposure period, the impedance between the photoelectric conversion element PD1 and the storage node P1 is controlled to be electrically high for the sensor elements 33 over the plurality of lines simultaneously (to be in a state in which in order to prevent the voltage value of the storage node P1 from changing due to electric charge generated in the photoelectric conversion element PD1, this voltage value is maintained). At the same time, in such a state of high impedance, the readout control is performed so that the sensor detection signals are sequentially output from the sensor elements 33 arranged in each line and thus, it may be possible to reduce the influence of the dark current accompanying a change in temperature so that stable detection operation can be performed. Incidentally, there may be merely performed such control that without the control of making the impedance between the photoelectric conversion element PD1 and the storage node P1 electrically high, only the control of resetting the sensor elements 33 over plural lines simultaneously is performed. In this case as well, as compared to the comparative example in FIG. 10, as for the sensor elements 33 arranged in the upper line in particular, the Reset period is shortened. As a result, as compared to the comparative example in FIG. 10, as for the sensor elements 33 arranged in the upper line in particular, useless exposure period is eliminated, which makes it possible to reduce the influence of the dark current accompanying a change in temperature.

Incidentally, in the sensor element 33, there is such a problem that when the predetermined reset voltage Vrst1 is applied, a voltage drop occurs in the storage node P1 due to capacitive coupling among elements and wires. In the present embodiment, the storage node P1 is provided with the capacitor C1 and thus, it may be also possible to reduce an influence of charging voltage due to this voltage drop.

Modifications

First Modification (Modification of Driving Timing)

Figure 23:
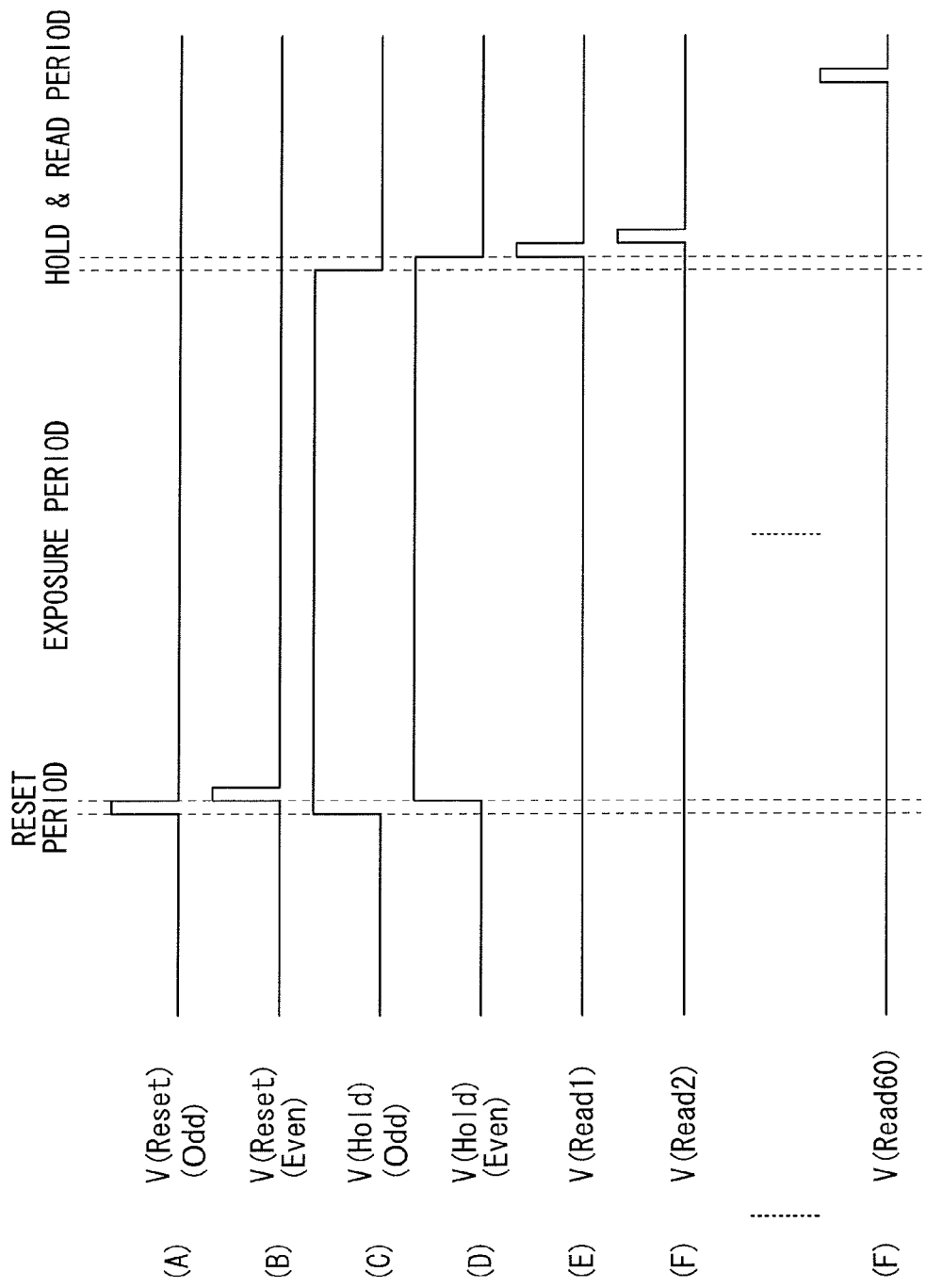
FIG. 23 is a diagram illustrating timing waveforms that represent the first modification of the sensor operation (image pickup operation)

FIG. 23 illustrates timing waveforms representing the first modification of the sensor operation (image pickup operation). In the above description of the driving in FIG. 9, the processing during the Reset period and the processing during the Hold period are performed for all from upper to lower lines collectively at the same time, but the processing may be divided into plural parts and performed. In the modification in FIG. 23, the control of the reset transistor Tr1 (the processing during the Reset period) and the control of making the impedance between the photoelectric conversion element PD1 and the storage node P1 electrically high (the processing during the Hold period) are performed separately for the sensor elements 33 arranged in odd-numbered lines and the sensor elements 33 arranged in even-numbered lines.

V(Reset) (Odd) in Part (A) of FIG. 23 indicates timing of a reset-control signal voltage for the sensor elements 33 arranged in the odd-numbered lines. V(Reset) (Even) in Part (B) of FIG. 23 indicates timing of a reset-control signal voltage for the sensor elements 33 arranged in the even-numbered lines. V(Hold) (Odd) in Part (C) of FIG. 23 indicates timing of a hold-control signal voltage for the sensor elements 33 arranged in the odd-numbered lines. V(Hold) (Even) in Part (D) of FIG. 23 indicates timing of a hold-control signal voltage for the sensor elements 33 arranged in the even-numbered lines. V(Read1), V(Read2), . . . and V(Read60) in Parts (E), (F), . . . and (F) of FIG. 23 each indicate timing of a read-control signal voltage for each line.

As illustrated in Parts (A) and (B) of FIG. 23, the Reset processing for the even-numbered lines may be caused to start upon a delay of a duration corresponding to a 1H image-pickup (detection) period for one horizontal line, after the start of the Reset processing for the odd-number lines. Similarly, as illustrated in Parts (C) and (D) of FIG. 23, the Hold processing for the even-numbered lines may be caused to start upon a delay of a duration corresponding to the 1H period after the start of the Hold processing for the odd-number lines.

Second Modification

Figure 24:
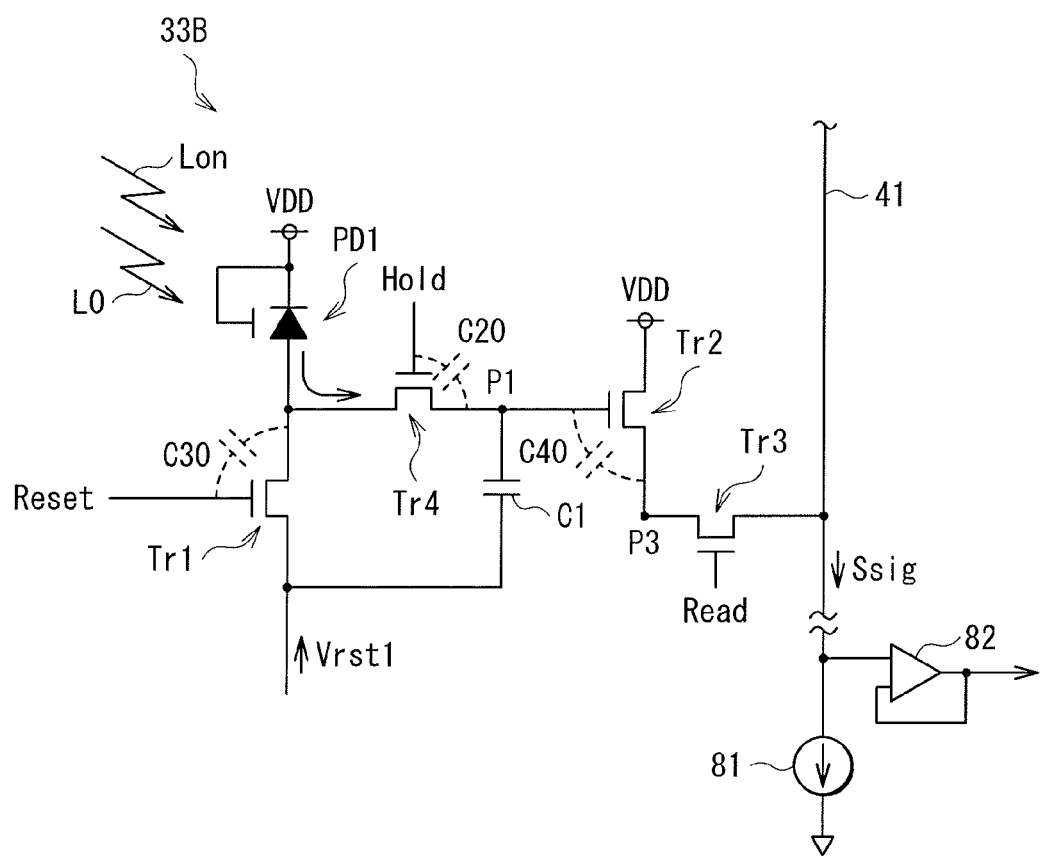
FIG. 24 is a circuit diagram illustrating a configuration example of a sensor element according to a second modification.

FIG. 24 illustrates a configurational example of a sensor element 33B according to the second modification. The basic structure of this sensor element 33B is substantially similar to that of the sensor element 33 in FIG. 5, but the other end of the capacitor C1 is connected, together with the source of the reset transistor Tr1, to the supply line of the reset voltage Vrst1. In this sensor element 33B, a constant current source 81 is connected to the readout line 41. An amplifier 82 amplifying a sensor detection signal (read signal) from the sensor element 33B also is connected to the readout line 41. In the reset transistor Tr1, a coupling capacitance C30 is produced between element wires. In the hold switching transistor Tr4, a coupling capacitance C20 is produced between element wires. In the amplification transistor Tr2, a coupling capacitance C40 is produced between element wires.

Figure 25:
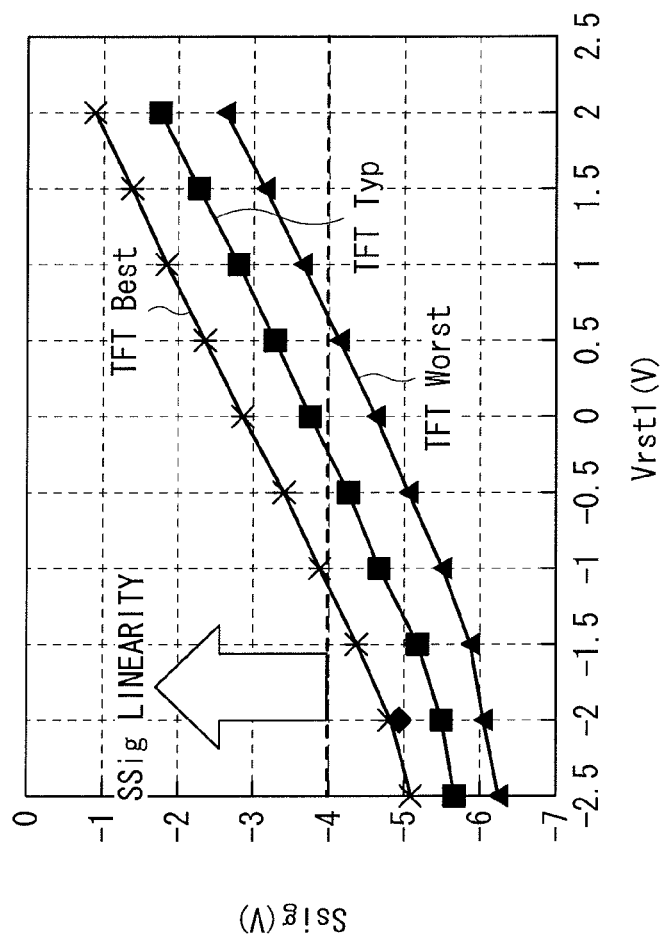
FIG. 25 is a graph showing an output voltage characteristic of a sensor detection signal when characteristic variations of transistors Tr2 and Tr3 on the read side of the sensor element according to the second modification are considered.

FIG. 25 shows an output voltage characteristic of the sensor detection signal when characteristic variations of the transistors Tr2 and Tr3 on the read side of the sensor element 33B are considered. A vertical axis indicates the sensor detection signal voltage (read signal voltage) Ssig, and a horizontal axis indicates the reset voltage Vrst1 applied during the Reset period before the exposure period. Incidentally, FIG. 25 shows the output voltage characteristic in a state in which there is no light incident upon the photoelectric conversion element PD1 (corresponding to the exposure period (extinguished) in FIG. 9). In FIG. 25, a case where the characteristic to serve as a transistor is excellent (TFT Best), a case where the characteristic is typical (TFT Typ) and a case where the characteristic is inferior (TFT Worst) are compared to one another.

Figure 26:
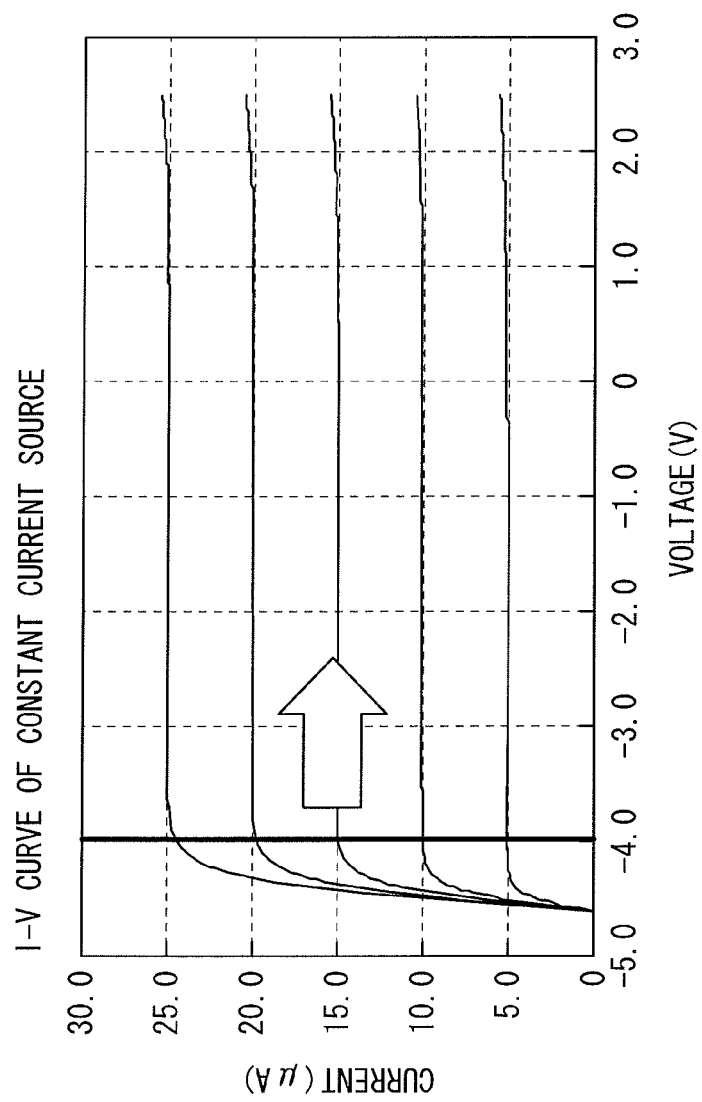
FIG. 26 is a graph illustrating an I-V curve of a constant current source connected to a readout line of the sensor detection signal.

FIG. 26 shows an I (current)-V (voltage) curve of the constant current source 81. A horizontal axis in FIG. 26 indicates an input voltage, but this input voltage is the sensor detection signal voltage Ssig. FIG. 26 shows characteristics of plural constant current values. For each of the plurality of constant current values, in order to obtain a stable fixed constant current characteristic, a predetermined input voltage (not less than −4V in the example of FIG. 26) may be necessary. Here, when the output voltage characteristic in FIG. 25 is taken into consideration, in order to obtain a stable input voltage (sensor detection signal voltage Ssig) of −4V or more, in the case of the typical characteristic (TFT Typ), 0V or more is sufficient for the reset voltage Vrst1 applied during the Reset period. However, in the case in which the characteristic to serve as a transistor element is inferior (TFT Worst), when the reset voltage Vrst1 of around 0V is applied, it is difficult to obtain a stable input voltage reflecting consideration of the I-V curve of the constant current source 81 in FIG. 26.

Figure 27:
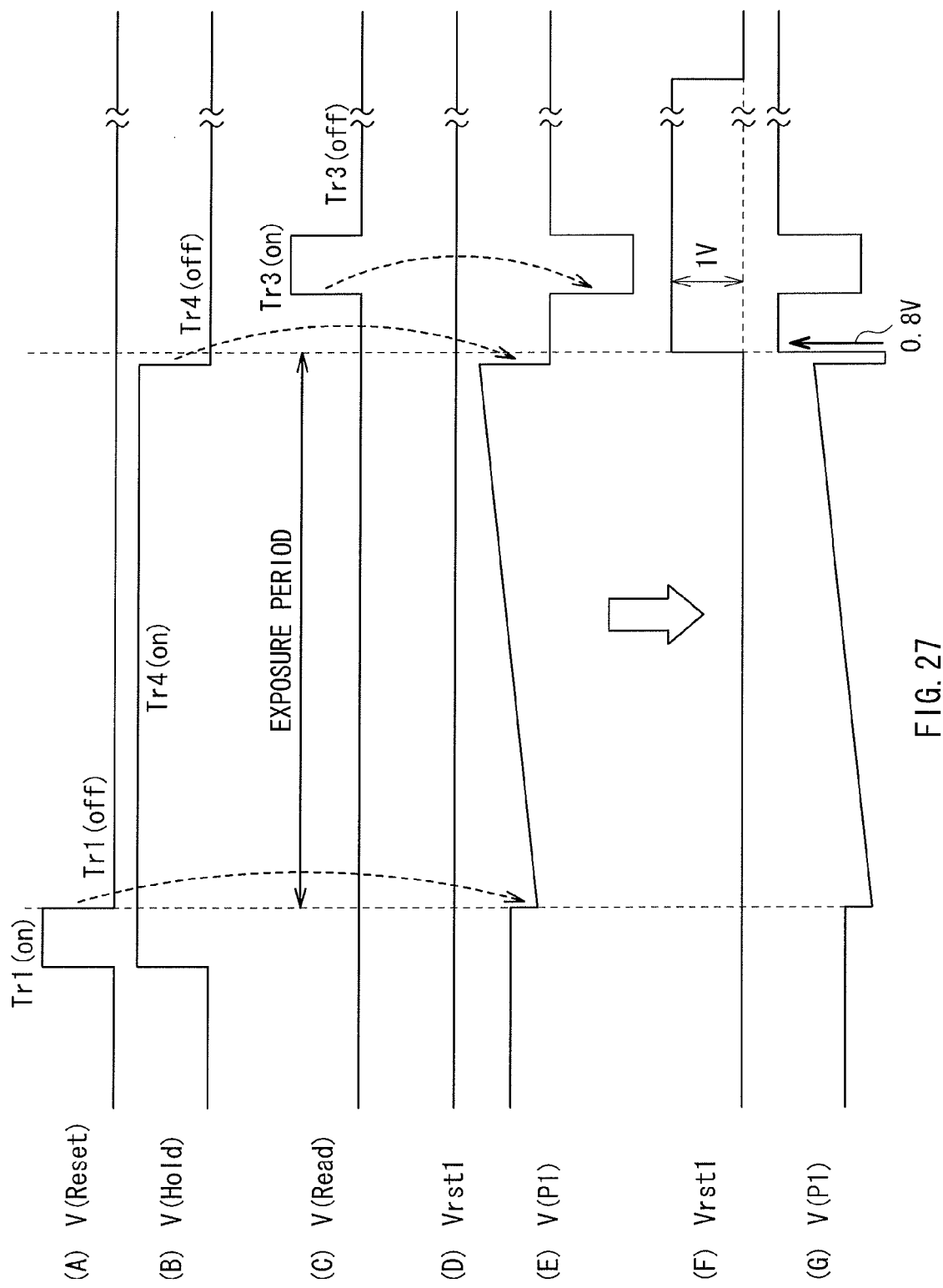
FIG. 27 is a timing chart representing the second modification of the sensor operation.

Thus, in order to address such a problem, the following driving control is performed in the present modification. FIG. 27 shows, in Parts (A) through (C), a timing chart representing the second modification of the sensor operation. Parts (A) through (C) of FIG. 27 show the timing chart of an arbitrary one of the plurality of sensor elements 33B. The entire operation of the plurality of sensor elements 33B is similar to that in FIG. 9. Part (A) of FIG. 27 shows a timing waveform of the reset-control signal voltage V(Reset) applied to the gate of the reset transistor Tr1. Part (B) of FIG. 27 shows a timing waveform of the hold-control signal voltage V(Hold) applied to the gate of the hold switching transistor Tr4. Part (C) of FIG. 27 shows a timing waveform of the read-control signal voltage V(Read) applied to the gate of the select/read transistor Tr3. Part (F) of FIG. 27 shows a timing waveform of the reset voltage Vrst1. Part (G) of FIG. 27 shows a timing waveform of a voltage V(P1) of the storage node P1. Parts (D) and (E) of FIG. 27 shows timing waveforms that serve as comparative examples for Parts (F) and (G) of FIG. 27.

First, the photo-detection drive circuit 13 (FIG. 1) causes the reset transistor Tr1 to be ON, thereby performing processing for resetting the voltage value of the storage node P1 with the predetermined reset voltage Vrst1 (0V) (Part (A) of FIG. 27). Also, the photo-detection drive circuit 13 causes the hold switching transistor Tr4 to be ON at the time when the reset transistor Tr1 is caused to be ON (Part (B) of FIG. 27), and performs exposure (storage of electric charge converted by the photoelectric conversion element PD1 in the storage node P1 (capacitor C1)) (Part (C) of FIG. 27, exposure period). Subsequently, the photo-detection drive circuit 13 causes the hold switching transistor Tr4 to be OFF, and controls the impedance between the photoelectric conversion element PD1 and the storage node P1 to become high (Part (B) of FIG. 27). Afterwards, the photo-detection drive circuit 13 causes the select/read transistor Tr3 to be ON (Part (C) of FIG. 27) and performs processing for reading the voltage value of the storage node P1 (capacitor C1) as the sensor detection signal.

Here, when the driving control as illustrated in Parts (A) through (C) of FIG. 27 is performed, along with the on-off operation of each transistor in the sensor element 33B, the voltage V(P1) of the storage node P1 is affected by capacitive coupling of each transistor and therefore the voltage fluctuates. Now, voltage fluctuations of this storage node P1 will be discussed.

First, there will be described voltage fluctuations of the storage node P1 (Part (E) of FIG. 27), when the reset voltage Vrst1 is a constant voltage (0V) as illustrated in the comparative example in Part (D) of FIG. 27. At first, when the reset transistor Tr1 is changed from the ON state to the OFF state (Part (A) of FIG. 27), the voltage V(P1) of the storage node P1 drops via the coupling capacitance C30. Subsequently, the voltage V(P1) of the storage node P1 rises during the exposure period according to electric charge generated by the photoelectric conversion element PD1, but when the hold switching transistor Tr4 is changed from the ON state to the OFF state (Part (B) of FIG. 27), the voltage V(P1) of the storage node P1 drops via the coupling capacitance C20. Further, when the select/read transistor Tr3 is changed from the OFF state to the ON state (Part (C) of FIG. 27), the select/read transistor Tr3 serves as a resistive component and therefore a voltage drop occurs at a connection node P3 between the amplification transistor Tr2 and the select/read transistor Tr3. As a result of the voltage drop at the connection node P3, the voltage V(P1) of the storage node P1 drops via the coupling capacitance C40 of the amplification transistor Tr2. The sensor detection signal voltage Ssig that is read out ultimately is the voltage V(P1) of the storage node P1 after these voltage drops.

Thus, in the present modification, in order to reduce the influence of these voltage drops, the photo-detection drive circuit 13 (FIG. 1) causes the reset voltage Vrst1 to temporarily rise (e.g. a rise of 1V) as illustrated in Part (F) of FIG. 27, and performs control of applying a predetermined offset voltage to the voltage value of the storage node P1 via the other end of the capacitor C1. The timing for starting the rise of the reset voltage Vrst1 is the time after a lapse of the exposure period (after the hold switching transistor Tr4 is caused to be OFF) and before reading of the sensor detection signal (the select/read transistor Tr3 is caused to be ON). As a result, after the predetermined offset voltage is applied to the voltage value of the storage node P1, upon the lapse of the exposure period, the voltage value to which the predetermined offset voltage is applied is read out as the sensor detection signal. Incidentally, at this moment, the reset transistor Tr1 and the hold switching transistor Tr4 are in the OFF state and thus, the reset voltage Vrst1 is not applied from the reset transistor Tr1 and the hold switching transistor Tr4 side to the storage node P1. For example, by applying the reset voltage Vrst1 increased from 0V to 1V via the other end of the capacitor C1, it may be possible to offset the voltage value of the storage node P1 by about 0.8V without resetting the electric charge stored by the photoelectric conversion element PD1 (Part (G) of FIG. 27). As a result, the influence of the above described voltage drops is alleviated. Incidentally, the increased reset voltage Vrst1 is returned to the original predetermined voltage value (0V) after the sensor detection signals are read out for all the lines.

Figure 28:
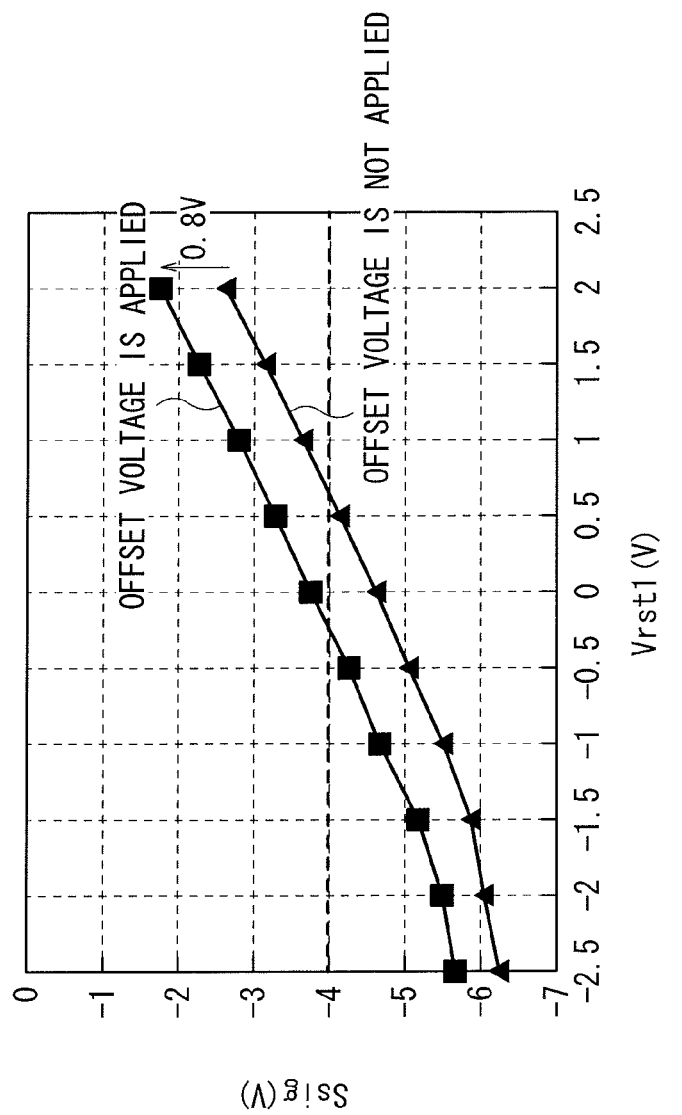
FIG. 28 is a graph illustrating an output voltage characteristic of the sensor detection signal according to the presence or absence of an offset voltage.

FIG. 28 shows output voltage characteristics of the sensor detection signal when the control of applying the offset voltage is performed (Parts (F) and (G) of FIG. 27) and when the offset voltage is not applied (Parts (D) and (E) of FIG. 27). Incidentally, FIG. 28 shows the characteristics corresponding to the case in which the characteristic to serve as a transistor element is inferior (TFT Worst) in FIG. 25. As apparent from FIG. 28, even when the characteristic to serve as a transistor element is inferior, it may be possible to obtain the characteristic closer to the typical characteristic by performing the control of applying the offset voltage.

Third Modification

Figure 30:
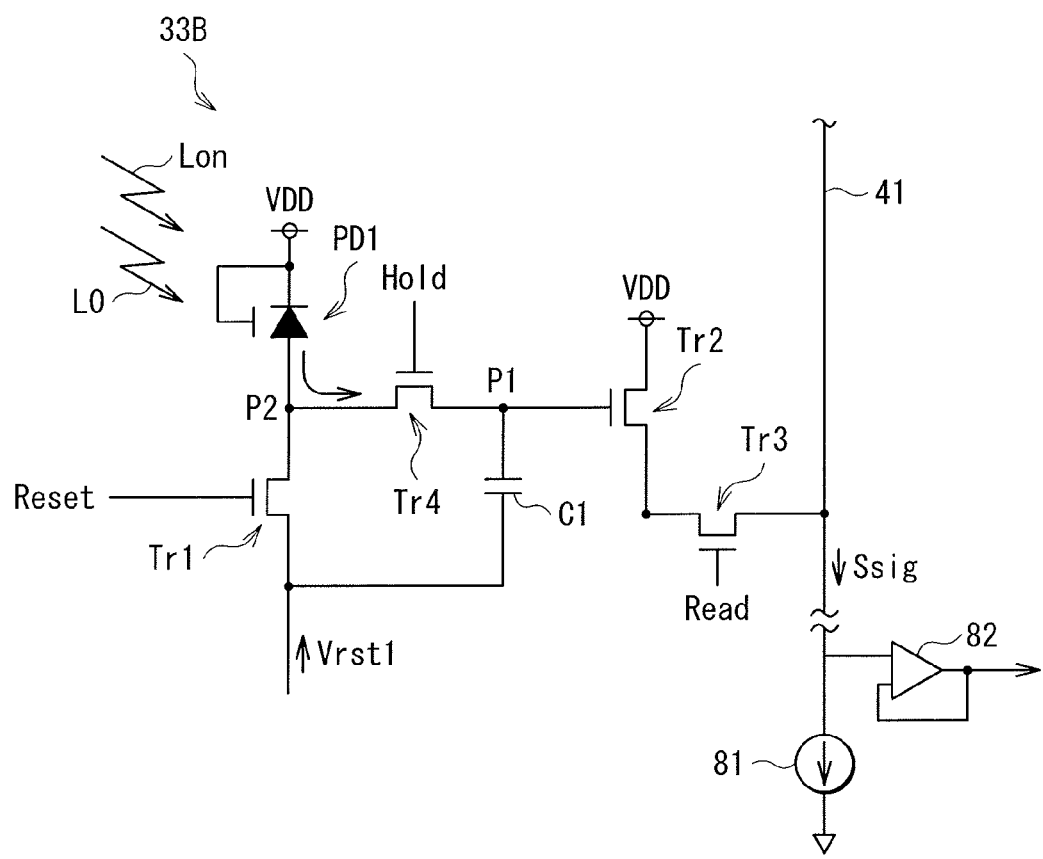
FIG. 30 is a circuit diagram illustrating a configuration example of the sensor element according to a third modification.

FIG. 30 illustrates a configurational example of the sensor element 33B according to the third modification. This third modification is similar to the second modification in FIG. 24 in terms of the connection relation between the components and the circuit elements, but the way of performing driving control is partially different.

Figure 31:
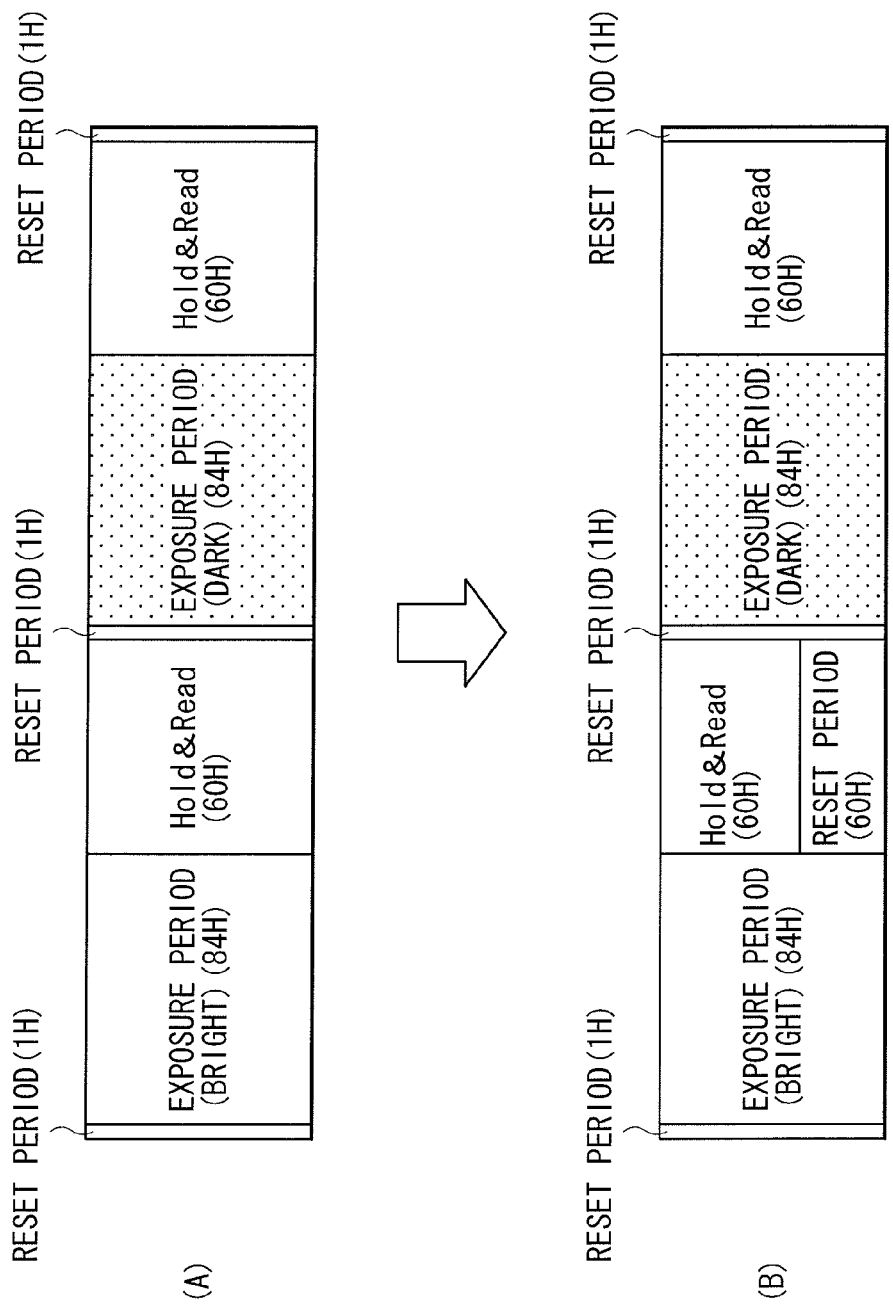
FIG. 31 is a diagram of a timing chart representing sensor operation of a comparative example in Part (A) and a timing chart representing sensor operation of the third modification in Part (B)

Part (A) of FIG. 31 shows a timing chart representing the sensor operation of a comparative example, while Part (B) of FIG. 31 shows a timing chart representing the sensor operation of the third modification. In each of Parts (A) and (B) of FIG. 31, a timing chart of an arbitrary one of the plurality of sensor elements 33B is illustrated. Part (A) of FIG. 31 corresponds to the entire operation for the plurality of sensor elements 33B illustrated in FIG. 9.

Figure 29A:
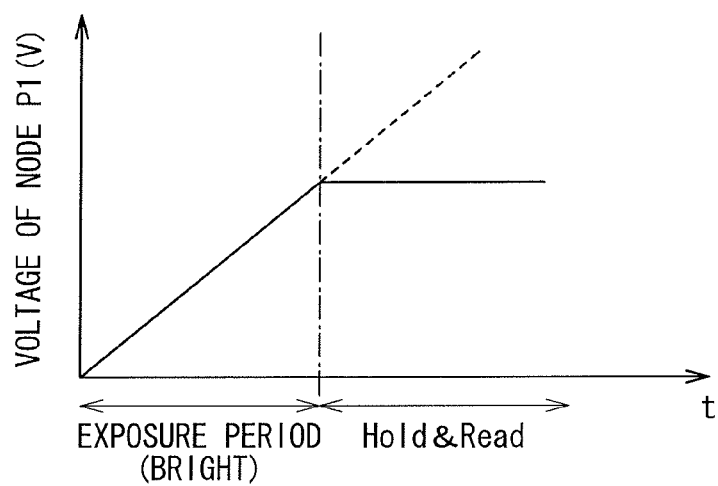
FIGS. 29A and 29B are a graph showing a voltage characteristic of the storage node P1, and a graph showing a voltage characteristic of a connection node P2 between the photoelectric conversion element and a hold switching transistor Tr4.
Figure 29B:
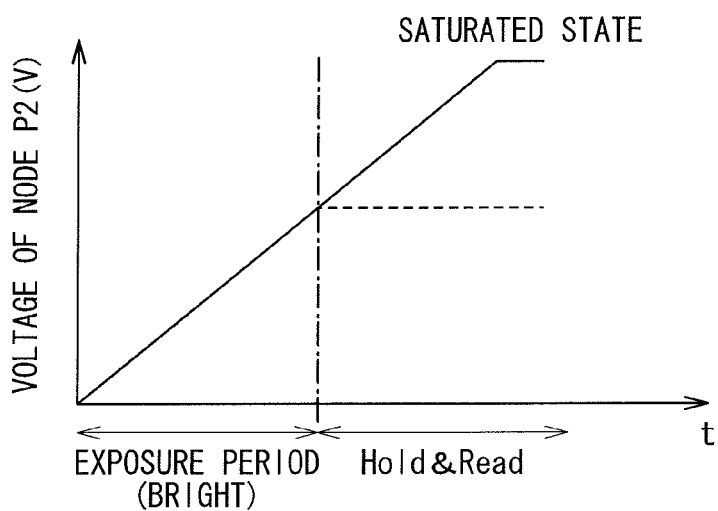

FIG. 29A illustrates a voltage characteristic of the storage node P1 when the sensor operation shown in Part (A) of FIG. 31 is performed. FIG. 29B illustrates a voltage characteristic of a connection node P2 between the photoelectric conversion element PD1 and the hold switching transistor Tr4, when the sensor operation shown in Part (A) of FIG. 31 is performed. In the sensor operation shown in Part (A) of FIG. 31, the hold switching transistor Tr4 is caused to be OFF after the exposure period. As a result, the sensor detection signal is read out while the impedance between the photoelectric conversion element PD1 and the storage node P1 is controlled to be electrically high (the voltage value of the storage node P1 is controlled to be in a state of being maintained so that the voltage value of the storage node P1 does not change due to generation of electric charge in the photoelectric conversion element PD1) (Hold period and Read period). In this case, the voltage value of the storage node P1 rises during the exposure period according to the electric charge generated in the photoelectric conversion element PD1 as illustrated in FIG. 29A, and remains constant during the Hold period and Read period.

On the other hand, in the connection node P2 on the photoelectric conversion element PD1 side, after the exposure period, the voltage keeps rising according to the electric charge generated in the photoelectric conversion element PD1 during the Hold period and Read period as well, and eventually enters a saturated state when the amount of incident light is large. When the connection node P2 enters the saturated state in this way, there is a possibility that the read operation after the next exposure period may be affected. Moreover, for example, a difference in sensor detection signals may be caused between the sensor elements 33B arranged in different lines. In this case, it may be possible to reset the connection node P2, together with the storage node P1, with the predetermined reset voltage Vrst1 (0V) by making the Reset period longer. Meanwhile, in this display device, an object is detected by using a difference between the sensor detection signals obtained in the state of the backlight 15 being on (exposure period (bright)) and the sensor detection signals obtained in the state of the backlight 15 being off (exposure period (dark)). For this reason, it is desirable that the time interval between the exposure period (bright) and the exposure period (dark) be short.

Thus in the present modification, in order to address the problem of the connection node P2 entering the saturated state, the driving control as illustrated in Part (B) of FIG. 31 is performed. To be more specific, in the present modification, the photo-detection drive circuit 13 (FIG. 1) causes, during the Hold period and Read period after the exposure period (bright), the reset transistor Tr1 to be ON, thereby performing processing for resetting the voltage value of the connection node P2 by applying the predetermined reset voltage Vrst1 (0V). Incidentally, during the Hold period, the hold switching transistor Tr4 is in the OFF state, and the impedance between the photoelectric conversion element PD1 as well as the reset transistor Tr1 and the storage node P1 is electrically high. Therefore, during the Hold period, even when the reset transistor Tr1 enters the ON state, the reset voltage Vrst1 is not applied from the reset transistor Tr1 side to the storage node P1. In other words, the storage node P1 is not reset. Subsequently, after a lapse of the Hold period and Read period, the reset operation of the storage node P1 is performed during the normal Reset period. As a result, it may be possible to improve the saturated state of the connection node P2 regardless of the fact that the time interval between the exposure period (bright) and the exposure period (dark) is the same as that in the sensor operation in Part (A) of FIG. 31.

Examples of Executing Application Program

Next, with reference to FIG. 32A through FIG. 35, there will be described some examples of executing an application program by the application-program executing section 11, in which the positional information and the like of the object detected by the proximity-object detection processing described above are used.

Figure 32A:
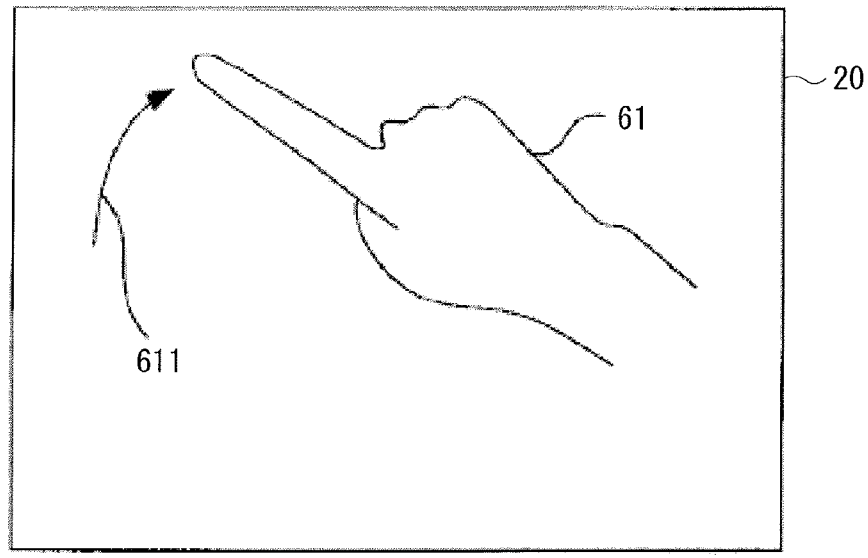
FIGS. 32A and 32B are explanatory diagrams illustrating a first example and a second example, respectively, of executing an application program by using a result of proximity-object detection processing in the display device illustrated in FIG. 1.

A first example illustrated in FIG. 32A is an example in which the surface of the I/O display panel 20 is touched by a finger tip 61, and a trail of touched points is displayed on the surface as a drawn line 611.

Figure 32B:
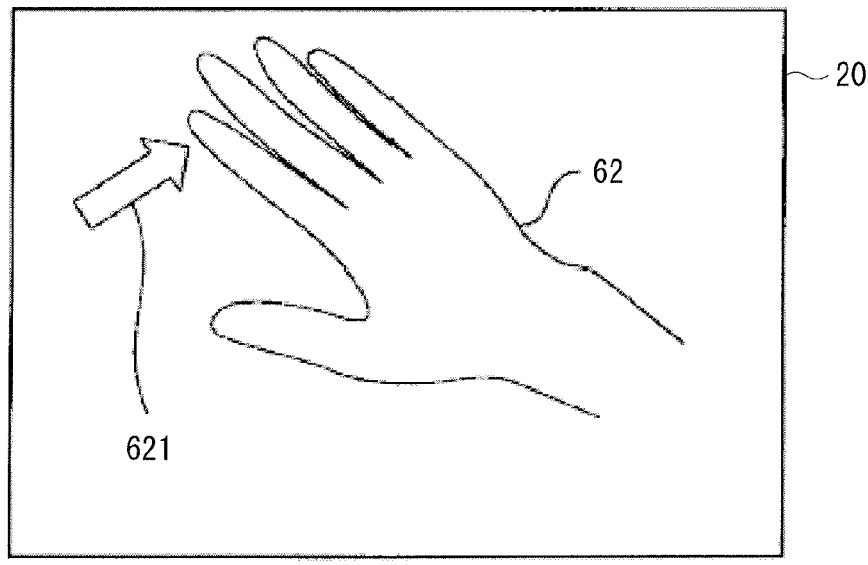

A second example illustrated in FIG. 32B is an example in which a gesture is recognized by using the shape of a hand. Specifically, the shape of a hand 62 touching (or near) the I/O display panel 20 is recognized, the recognized shape of the hand is displayed as a displayed object, and a movement 621 of the displayed object is used to carry out some processing.

Figure 33:
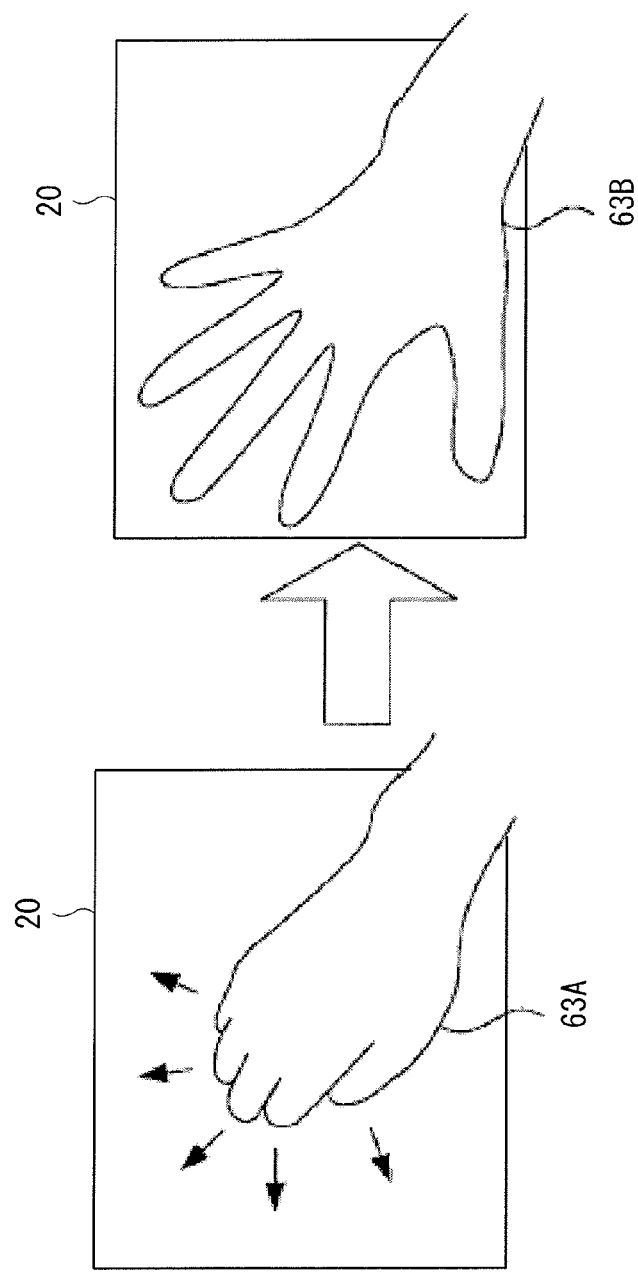
FIG. 33 is an explanatory diagram illustrating a third example of executing an application program by using a result of the proximity-object detection processing.

A third example illustrated in FIG. 33 is an example in which a closed hand 63A is changed to an open hand 63B, image recognition of a touch or an approach of each hand is performed by the I/O display panel 20, and processing based on the image recognition is executed. Through the processing based on the image recognition, it may be possible to give a direction such as zooming in. In addition, since it may be possible to give such a direction, when, for example, the I/O display panel 20 is connected to a personal computer, input through manipulation of switching commands on the personal computer can be replaced by input through the image recognition and thus, directions can be input more naturally.

Figure 34:
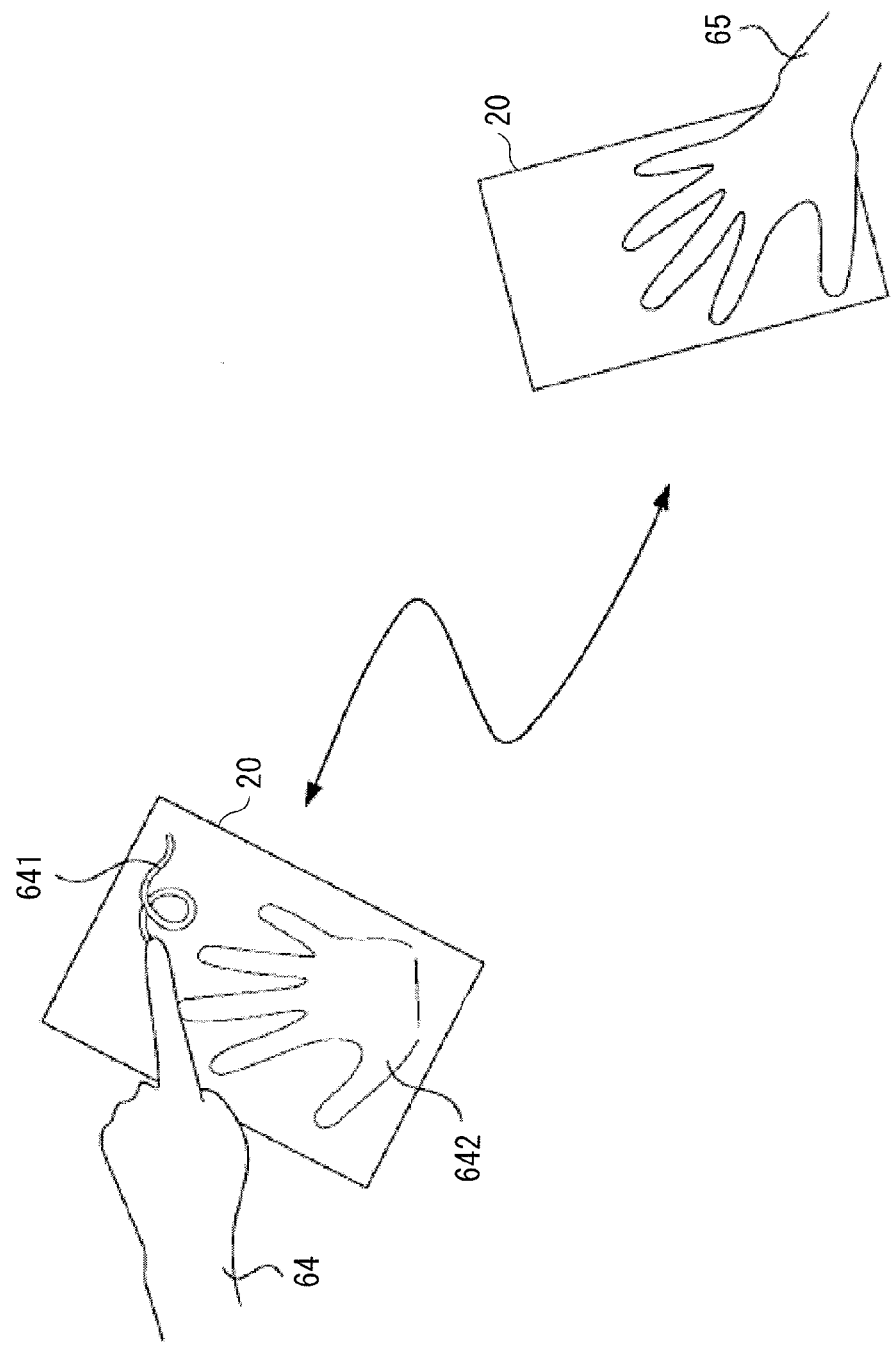
FIG. 34 is an explanatory diagram illustrating a fourth example of executing an application program by using a result of the proximity-object detection processing.

A fourth example illustrated in FIG. 34 is an example in which two I/O display panels 20 are prepared and connected to each other by some transmission sections. In this structure, an image obtained by detecting a touch on or an approach to one of the I/O display panels 20 may be transmitted to and then displayed by the other of the I/O display panels 20, and users operating the respective I/O display panels 20 may communicate with each other. For example, as illustrated in FIG. 34, it may be possible to perform such processing that one of the I/O display panels 20 is caused to obtain an image of the shape of a hand 65 through image recognition and transmit the obtained image to the other of the I/O display panels 20 that in turn is caused to display a hand shape 642 identical to the shape of the hand 65. It is also possible to perform processing such as causing a trail 641 displayed as a result of a touch by a hand 64 on the other of the I/O display panels 20 to be transmitted to and then displayed by the one of the I/O display panels 20. In this way, a state of drawing is transmitted as a moving image and handwritten characters or graphics are sent to a counterpart, which creates a possibility that the I/O display panel 20 may become a new communication tool. For instance, the I/O display panel 20 may be applied to a display panel of a portable telephone. Incidentally, FIG. 34 illustrates the example in which two I/O display panels 20 are prepared, but it may be possible to perform similar processing by connecting three or more I/O display panels 20 to one another with a transmission section.

Figure 35:
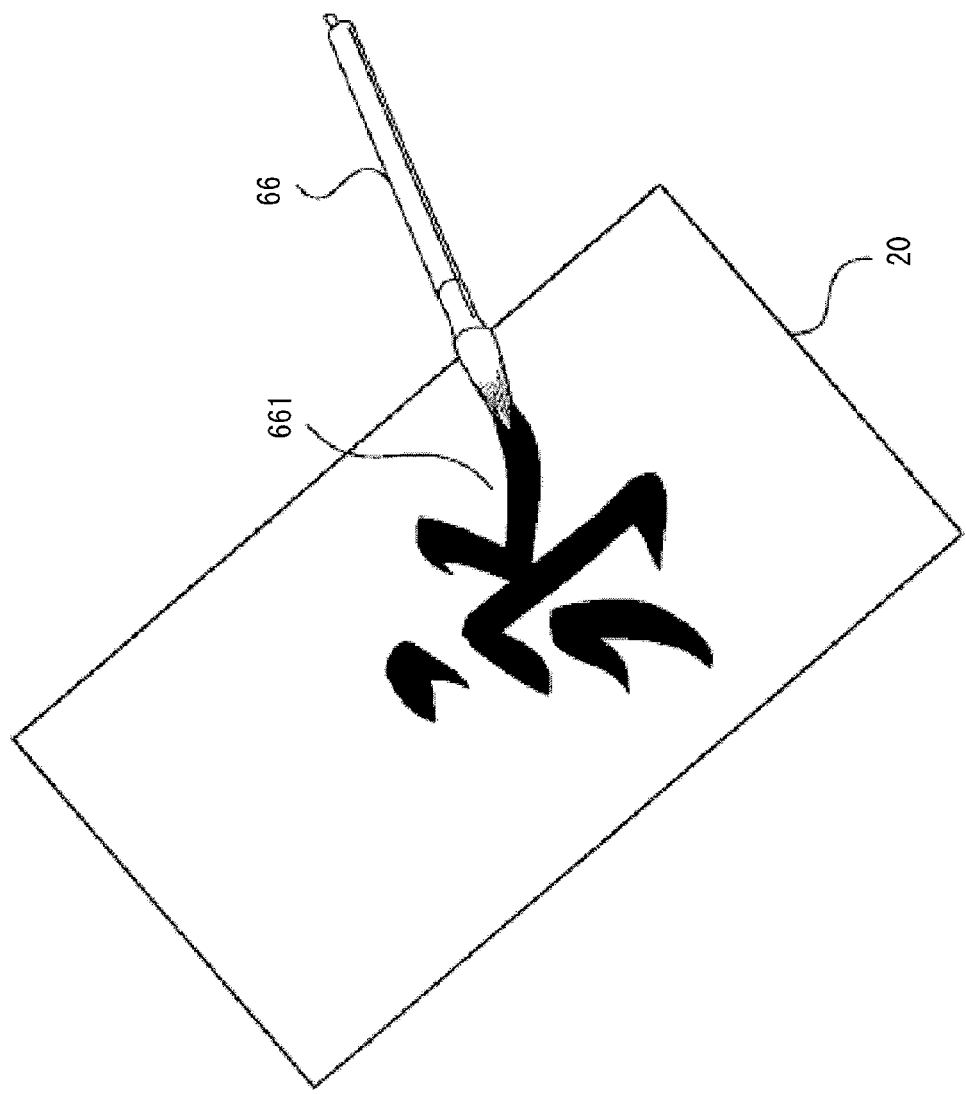
FIG. 35 is an explanatory diagram illustrating a fifth example of executing an application program by using a result of the proximity-object detection processing.

Further, as illustrated in a fifth example of FIG. 35, a writing brush 66 is used to write a character on the surface of the I/O display panel 20 by being caused to touch the surface of the I/O display panel 20, and points touched by the writing brush 66 are displayed as an image 661 on the I/O display panel 20 and thus, input of handwriting by the writing brush is made possible. In this case, it may be possible to recognize and realize even faint touches of the writing brush. In a case of recognition of handwriting in the past, for example, inclinations of a special pen are realized by electric-field detection in some digitizer. However, in the present example, a surface touched by the real writing brush is detected and thus, information can be input with a more realistic feeling.

MODULE AND APPLICATION EXAMPLES

Next, with reference to FIG. 36 through FIG. 40G, there will be described application examples of the display device with the input function described above. This display device can be applied to electronic units in all fields, which display externally-input video signals or internally-generated video signals as still or moving images. For example, the display device can be applied to electronic units such as television receivers, digital cameras, laptop computers, portable terminal devices such as portable telephones, and video cameras.

Application Example 1

Figure 36:
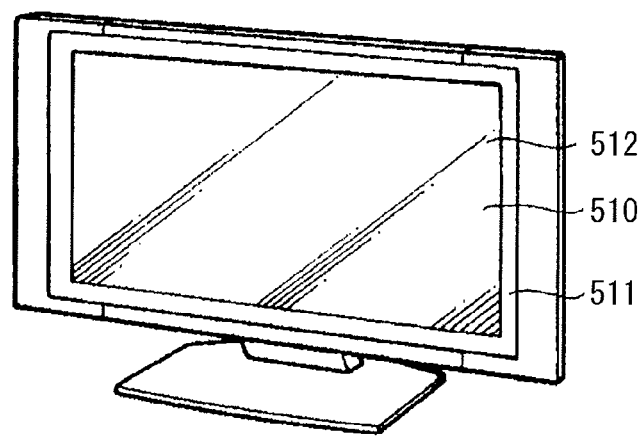
FIG. 36 is an external perspective view of a first application example of the display device illustrated in FIG. 1.

FIG. 36 illustrates an external view of a television receiver serving as a first example of the electronic units. This television receiver has, for example, a video display screen section 510 that includes a front panel 511 and a filter glass 512. The display device with the input function described above can be applied to the video display screen section 510 of this television receiver.

Application Example 2

Figure 37A:
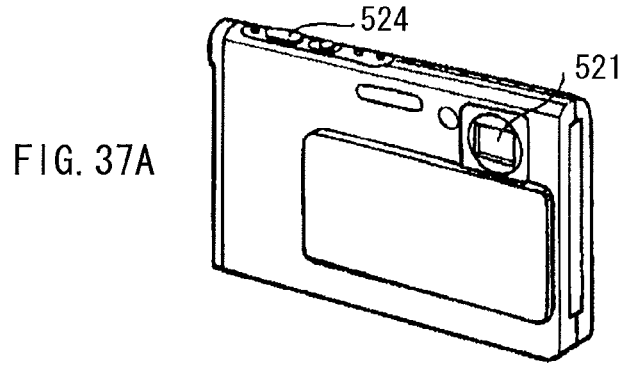
FIGS. 37A and 37B are perspective external views of a second application example, when viewed from the front and the back, respectively.
Figure 37B:
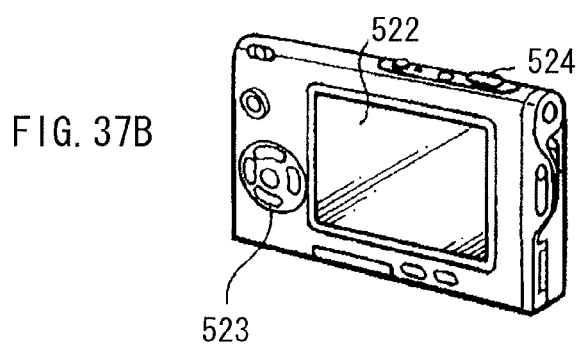

FIGS. 37A and 37B are external views of a digital camera serving as a second example of the electronic units. This digital camera includes, for example, a flash emitting section 521, a display section 522, a menu switch 523, and a shutter button 524. The display device with the input function described above can be applied to the display section 522 of this digital camera.

Application Example 3

Figure 38:
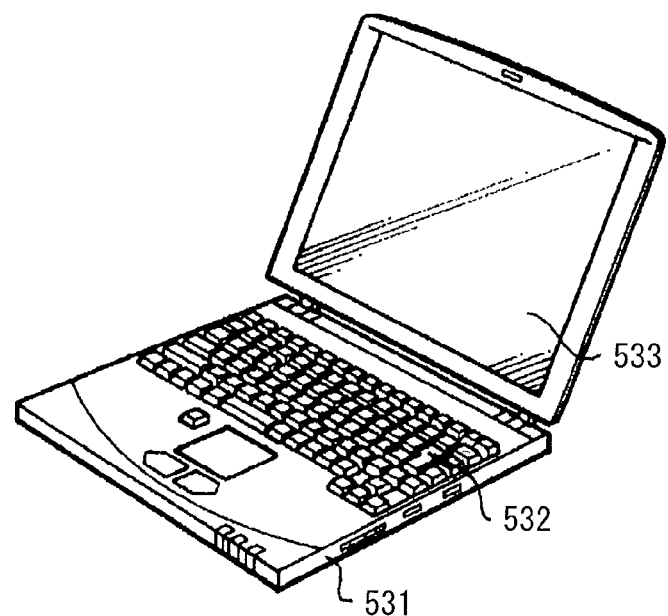
FIG. 38 is an external perspective view of a third application example.

FIG. 38 is an external view of a laptop computer serving as a third example of the electronic units. This laptop computer includes, for example, a main body 531, a keyboard 532 used to enter characters and the like, and a display section 533 that displays an image. The display device with the input function described above can be applied to the display section 533 of this laptop computer.

Application Example 4

Figure 39:
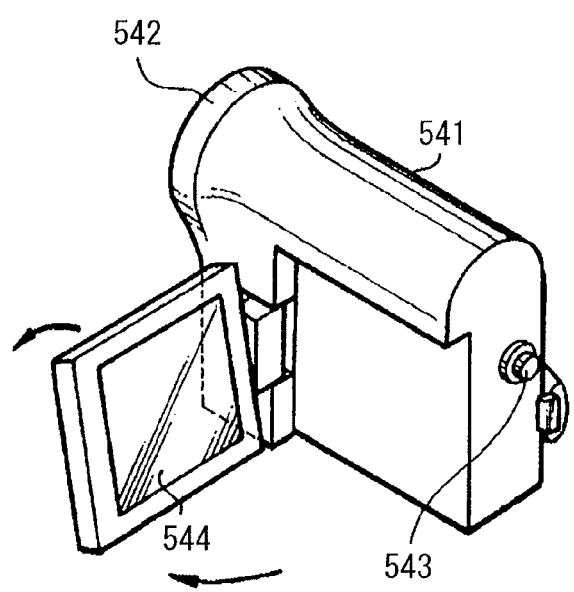
FIG. 39 is an external perspective view of a fourth application example.

FIG. 39 is an external view of a video camera serving as a fourth example of the electronic units. This video camera includes, for example, a main body 541, a lens 542 disposed on a front face of the main body 541 to shoot an image of a subject, a start/stop switch 543 used at the time of shooting, and a display section 544. The display device with the input function described above can be applied to the display section 544 of this video camera.

Application Example 5

FIGS. 40A through 40G are external views of a portable telephone serving as a fifth example of the electronic units. This portable telephone includes, for example, an upper housing 710, a lower housing 720, a coupling section (hinge section) 731 that couples the upper and lower housings 710 and 720 to each other, a display 740, a sub-display 750, a picture light 760, and a camera 770. The display device with the input function described above can be applied to the display 740 or the sub-display 750 of this portable telephone.

Other Embodiments

The present application can be modified and implemented in various ways without being limited to the above-described embodiment and application examples. For example, the embodiment and the like have been described above by taking the case of the I/O display panel 20 having the liquid crystal display panel provided with the backlight 15 as an example, but the backlight for display may double as a light for detection, or a light dedicated to detection may be provided. Moreover, when the light for detection is provided, it is preferable to use light in a wavelength range other than a visible-light range (for example, infrared ray).

Further, the embodiment and the like have been described above by employing the display device with the input function, which has the display panel (I/O display panel 20) including the display pixels 31RGB and the sensor elements 33, but the present application can be applied to any device other than the display device. For example, the present application can be applied to a mere sensor device without a display function. In this case, for example, in place of the I/O display panel 20, there may be provided a sensor panel in which only the sensor elements 33 are arranged in a matrix form within a single plane while the display pixels 31RGB are not provided.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A sensor device having a plurality of sensor elements arranged in a matrix form, and a sensor driving section driving the plurality of sensor elements, each of the plurality of sensor elements comprising:
    a photoelectric conversion element generating electric charge according to an amount of received light;
    a storage node storing electric charge generated by the photoelectric conversion element, to show a voltage which fluctuates according to the stored electric charge;
    a reset transistor having an end connected to an end of the photoelectric conversion element and resetting the voltage in the storage node to a predetermined reset voltage; and
    a readout section reading the voltage value resulted from the stored electric charge in the storage node, to output the resultant voltage value as a sensor detection signal,
    wherein the sensor driving section controls the reset transistor so that the storage nodes of the sensor elements over a plurality of sensor element lines are reset into the predetermined reset voltage at a time, and then performs read control after a lapse of a predetermined exposure period so as to allow the sensor detection signals to be sequentially outputted from the respective sensor elements arranged in each of the sensor element lines,
    wherein the sensor driving section performs, after the lapse of the exposure period, control of holding the voltage in the storage nodes in the sensor elements over the plurality of sensor element lines at a time so as to be prevented from fluctuation due to the electric charge generated in the photoelectric conversion element,
    wherein the sensor driving section performs, while the voltage in the storage nodes are maintained in such a hold state, read control so as to allow the sensor detection signals to be sequentially outputted from the respective sensor elements arranged in each of the sensor element lines,
    wherein the sensor driving section controls, after the lapse of the exposure period, the voltage in the storage node to be maintained in the hold state, through electrically controlling an impedance between the photoelectric conversion element and the storage node to be higher than an impedance during the exposure period, and
    wherein each of the plurality of sensor elements further includes a switching transistor interposed between a connection point between the photoelectric conversion element and the reset transistor and the storage node, the switching transistor allowing the impedance between the photoelectric conversion element and the storage node to be electrically high, and the sensor driving section controls the impedance between the photoelectric conversion element and the storage node through switching control of the switching transistor.

2. The sensor device according to claim 1, wherein
    the sensor driving section applies, after the lapse of the exposure period, a predetermined offset voltage to the storage node so as to adds the offset voltage to the voltage in the storage node, and then performs read control of reading out a voltage value resulted from application of the offset voltage and outputting the read voltage value as the sensor detection signal.

3. The sensor device according to claim 1, wherein
    the sensor driving section applies, after controlling the voltage in the storage node to be maintained in the hold state, a predetermined offset voltage to the storage node so as to adds the offset voltage to the voltage in the storage node, and then performs read control of reading out a voltage value resulted from application of the offset voltage and outputting the read voltage value as the sensor detection signal.

4. The sensor device according to claim 1, wherein
    the sensor driving section performs, after the lapse of the exposure period, control of holding the voltage in the storage nodes in the sensor elements over the plurality of sensor element lines at a time, and performs such control that the reset voltage is applied to a connection node between the photoelectric conversion element and the switching transistor through controlling the reset transistor.

5. The sensor device according to claim 1, wherein
    the sensor driving section performs control of the reset transistor and control of allowing the impedance between the photoelectric conversion element and the storage node electrically to be high, both of the controls being performed separately for the sensor elements arranged in odd-numbered lines and for the sensor elements arranged in even-numbered lines.

6. The sensor device according to claim 1, wherein
    each of the plurality of sensor elements further includes a capacitor having an end connected to the storage node.

7. The sensor device according to claim 6, wherein
    the capacitor includes a first electrode formed as the storage node and second electrodes sandwiching the storage node from upper side and lower side with predetermined space in between.

8. The sensor device according to claim 1, wherein the sensor driving section includes:
    a read-control buffer outputting, for each line, a read-control signal for controlling the readout section;
    a reset-control buffer outputting, for each line, a reset-control signal for controlling the reset transistor; and
    a switching-control buffer outputting, for each line, a switching-control signal for controlling the switching transistor, and
    the read-control buffer is connected to a negative power line which is independent of power lines for the reset-control buffer and the switching-control buffer.

9. The sensor device according to claim 8, wherein each of the reset-control buffer and the switching-control buffer includes:
    a first transistor allowing an output signal to be high;
    a second transistor allowing the output signal to be low; and
    a third transistor allowing the output signal to be low, the third transistor having an electric current driving capability higher than that of the second transistor,
    inversion of the output signal from high to low being performed step by step through allowing the second transistor to be ON at first and subsequently allowing the third transistor to be ON.

10. The sensor device according to claim 9, wherein the first, second and third transistors are connected to respective power lines for supplying power voltages different from one another.

11. The sensor device according to claim 1, further comprising:
   a backlight periodically emitting illumination light from a rear side of a sensor panel toward a surface of the sensor panel, the sensor panel being provided with the plurality of sensor elements arranged in the matrix form in a predetermined sensor region; and
   a signal processing section detecting an object in proximity to the surface of the sensor panel based on a difference between the sensor detection signals obtained from the sensor elements when the sensor elements are radiated with the illumination light from the backlight and the sensor detection signals obtained from the sensor elements when the sensor elements are not radiated with the illumination light.

12. The sensor device according to claim 1, wherein the photoelectric conversion element is a PIN photodiode that includes an anode electrode, a cathode electrode, a p-type semiconductor region connected to the anode electrode, an n-type semiconductor region connected to the cathode electrode, and an intrinsic semiconductor region formed between the p-type semiconductor region and the n-type semiconductor region.

13. A method of driving a sensor element, comprising steps of:
   providing a plurality of sensor elements arranged in a matrix form, each of the sensor elements including:
   a photoelectric conversion element generating electric charge according to an amount of received light;
   a storage node storing electric charge generated by the photoelectric conversion element, to show a voltage which fluctuates according to the stored electric charge;
   a reset transistor having an end connected to an end of the photoelectric conversion element and resetting the voltage in the storage node to a predetermined reset voltage; and
   a read out section reading the voltage value resulted from the stored electric charge in the storage node, to output the resultant voltage value as a sensor detection signal, and
   controlling the reset transistor so that the storage nodes of the sensor elements over a plurality of sensor element lines are reset into the predetermined reset voltage at a time, and then performs read control after a lapse of a predetermined exposure period so as to allow the sensor detection signals to be sequentially outputted from the respective sensor elements arranged in each of the sensor element lines,
   wherein performing, after the lapse of the exposure period, control of holding the voltage in the storage nodes in the sensor elements over the plurality of sensor element lines at a time so as to be prevented from fluctuation due to the electric charge generated in the photoelectric conversion element,
   wherein performing, while the voltage in the storage nodes are maintained in such a hold state, read control so as to allow the sensor detection signals to be sequentially outputted from the respective sensor elements arranged in each of the sensor element lines,
   wherein controlling, after the lapse of the exposure period, the voltage in the storage node to be maintained in the hold state, through electrically controlling an impedance between the photoelectric conversion element and the storage node to be higher than an impedance during the exposure period, and
   wherein each of the plurality of sensor elements further includes a switching transistor interposed between a connection point between the photoelectric conversion element and the reset transistor and the storage node, the switching transistor allowing the impedance between the photoelectric conversion element and the storage node to be electrically high, and the sensor driving section controls the impedance between the photoelectric conversion element and the storage node through switching control of the switching transistor.

14. A display device with an input function having a display panel provided with a plurality of display pixels arranged in a matrix form and a plurality of sensor elements arranged in a matrix form, a display drive section driving the plurality of display pixels, and a sensor drive section driving the plurality of sensor elements, each of the plurality of sensor elements comprising:
   a photoelectric conversion element generating electric charge according to an amount of received light;
   a storage node storing electric charge generated by the photoelectric conversion element, to show a voltage which fluctuates according to the stored electric charge;
   a reset transistor having an end connected to an end of the photoelectric conversion element and resetting the voltage in the storage node to a predetermined reset voltage; and
   a readout section reading the voltage value resulted from the stored electric charge in the storage node, to output the resultant voltage value as a sensor detection signal,
   wherein the sensor driving section controls the reset transistor so that the storage nodes of the sensor elements over a plurality of sensor element lines are reset into the predetermined reset voltage at a time, and then performs read control after a lapse of a predetermined exposure period so as to allow the sensor detection signals to be sequentially outputted from the respective sensor elements arranged in each of the sensor element lines,
   wherein the sensor driving section performs, after the lapse of the exposure period, control of holding the voltage in the storage nodes in the sensor elements over the plurality of sensor element lines at a time so as to be prevented from fluctuation due to the electric charge generated in the photoelectric conversion element,
   wherein the sensor driving section performs, while the voltage in the storage nodes are maintained in such a hold state, read control so as to allow the sensor detection signals to be sequentially outputted from the respective sensor elements arranged in each of the sensor element lines,
   wherein the sensor driving section controls, after the lapse of the exposure period, the voltage in the storage node to be maintained in the hold state, through electrically controlling an impedance between the photoelectric conversion element and the storage node to be higher than an impedance during the exposure period, and
   wherein each of the plurality of sensor elements further includes a switching transistor interposed between a connection point between the photoelectric conversion element and the reset transistor and the storage node, the switching transistor allowing the impedance between the photoelectric conversion element and the storage node to be electrically high, and the sensor driving section controls the impedance between the photoelectric conversion element and the storage node through switching control of the switching transistor.

15. An electronic unit comprising the display device with the input function according to claim 14.

* * * * *